United States Patent [19]

Dawson et al.

[11] Patent Number: 5,112,433

[45] Date of Patent: May 12, 1992

[54] PROCESS FOR PRODUCING SUB-MICRON CERAMIC POWDERS OF PEROVSKITE COMPOUNDS WITH CONTROLLED STOICHIOMETRY AND PARTICLE SIZE

[75] Inventors: William J. Dawson, Columbus; Scott L. Swartz, Dublin, both of Ohio

[73] Assignee: Battelle Memorial Institute, Columbus, Ohio

[21] Appl. No.: 295,166

[22] Filed: Dec. 9, 1988

[51] Int. Cl.$^5$ .................. C30B 7/10; C30B 29/22
[52] U.S. Cl. .................. 156/623 R; 156/621; 156/DIG. 75; 156/DIG. 85; 156/DIG. 95; 423/593; 423/598; 252/62.9; 501/134
[58] Field of Search .................. 473/593, 598, 623 R, 473/621, DIG. 75, DIG. 55, DIG. 95; 501/134; 252/62.9

[56] References Cited

U.S. PATENT DOCUMENTS

| | | | |
|---|---|---|---|
| 3,928,220 | 12/1975 | Slusarczuk | 423/594 |
| 3,963,630 | 6/1976 | Yonezawa et al. | 252/62.9 |
| 4,082,601 | 4/1978 | Regreny et al. | 156/623 R |
| 4,643,984 | 2/1987 | Abe et al. | 501/134 |
| 4,731,153 | 3/1988 | Hirano et al. | 156/DIG. 85 |
| 4,784,794 | 11/1988 | Kato | 423/85 |
| 4,829,031 | 5/1989 | Roy et al. | 501/153 |
| 4,829,033 | 5/1989 | Menoshi et al. | 501/137 |
| 4,832,939 | 5/1989 | Menashi et al. | 501/136 |
| 4,849,195 | 7/1989 | Anton et al. | 423/598 |
| 4,863,883 | 9/1989 | Menashi et al. | 501/134 |
| 4,882,014 | 11/1989 | Coyle et la. | 204/96 |

OTHER PUBLICATIONS

Clarke et al., "The Growth and Characterization of PdZr$_x$Ti$_{1-x}$O$_3$ Single Crystals", Journal of Crystal Growth, vol. 33, vol (1976) pp. 29 to 38.
Direct Precipitation of Lead Zirconate Titanate by the Hydrothermal Method; T. R. N. Kutty et al.; Mat. Res. Bull., vol. 19; 1984; pp. 1479-1788.
Chemical Abstracts; vol. 105:231,414r; Manufacture of Lead Lanthanum Zirconate Titanate Ceramics Having Light Transmittance; Shirasaki et al.; Japan; Kokai T. K., 61[86]-106,457; 24 May 1986.

(List continued on next page.)

Primary Examiner—Robert Kunemund
Attorney, Agent, or Firm—Klaus H. Wiesmann

[57] ABSTRACT

A process for making a crystalline ceramic powder having a perovskite structure, ABO$_3$, that includes the steps of preparing a first acidic solution containing one or more elements selected from the group consisting of hafnium, zirconium, titanium, niobium, tantalum, uranium, iron, antimony, lanthanum, bismuth, thorium, indium, nickel, manganese, neodymium, samarium, cobalt, tungsten, tin, vanadium, dysprosium, praseodymium, yttrium, promethium, europium, cerium, ytterbium, lutetium, scandium, gadolinium, terbium, holmium, erbium, thulium, chromium, potassium, and lithium; preparing a second basic solution containing a sufficient concentration of hydroxide to provide a predetermined pH when mixed with the first solution; adding the first acidic solution to the second basic solution to precipitate a substantially pure mixture of hydroxides; washing the precipitate to remove hydroxide and salt impurities that solubilize lead or other constituent elements of the powder; preparing an aqueous slurry of the washed precipitate and adding oxides or hydroxides of one or more of the elements selected from the group consisting of barium, strontium, calcium, magnesium, lead, zinc, yttrium, magnesium, manganese, cobalt, zinc and nickel; hydrothermally treating the slurry at an elevated temperature and pressure for a time sufficient to form the powder; and drying the powder; wherein when lead, zirconium and titanium are selected the perovskite has the general formula: Pb(Zr$_{1-x}$Ti$_x$)O$_3$, wherein x has a value of:

(1) between 0 and 0.44;
(2) between 0.44 and 0.55, and a total dopant and solid solution substitution level between 13 and 50 mole percent;
(3) between 0.55 and 1.00; and wherein when x has a value of (1) or (3) then the total dopant and solid substitution level ranges from 0 to 50 mole percent.

16 Claims, 12 Drawing Sheets

OTHER PUBLICATIONS

Hydrothermal Preparation of Ba(Ti,Zr)O$_3$ Fine Powders; R. Vivekanandan et al.; Mat Res. Bull., vol. 22; 1986; pp. 99–108.

Precipitation of Lead Zirconate Titanate Solid Solutions Under Hydrothermal Conditions; K. C. Beal; paper given at American Ceramic Society Conference; Boston, Mass.; 13 pages; 1986.

Preceedings of the First International Conference on Ceramic Powder Processing Science; Orlando, Fla.; pp. 154–162; 1987; Watson et al.

World Patent Index WPI Acc. No. 87-132436/19; Manufacturing Barium-or Strontium Titanate from Specified Salt in Aqueous Titanium Tetrachloride Solution and Treating Hydrothermally after adding Hydroxide-JP 62[87]172,525; Apr. 3, 1987.

Chemical Abstracts; vol. 109:47011p; Manufacture of Lead Titanate Zirconate-Lead Niobate Manganate-Type Pyroelectric Ceramics for Infrared Sensors; Japan Kokai Tokkyo Koho, JP 62[87]241,825.

Chemical Abstracts; vol. 109:47, 010n; Manufacture of Lead Titanate Zirconate-Lead Niobate Manganate Type Ceramic Powder for Pyroelectric Materials, Jpn. Kokai Tokkyo Koho, JP 62[87]241,826.

Ultrafine Powders of SrTiO$_3$ From the Hydrothermal Preparation and Their Catalytic Activity in the Photolysis of Water; M. Avudaithai et al.; Mat. Res. Bull., vol. 22; 1987; pp. 641–650.

Perovskites; Robert M. Hazen; Scientific American; Jun., 1988; pp. 74–81.

Hydrothermal Synthesis of Advanced Ceramic Powders; William J. Dawson; Ceramic Bulletin; vol. 67, No. 10; 1988; pp. 1673–1678.

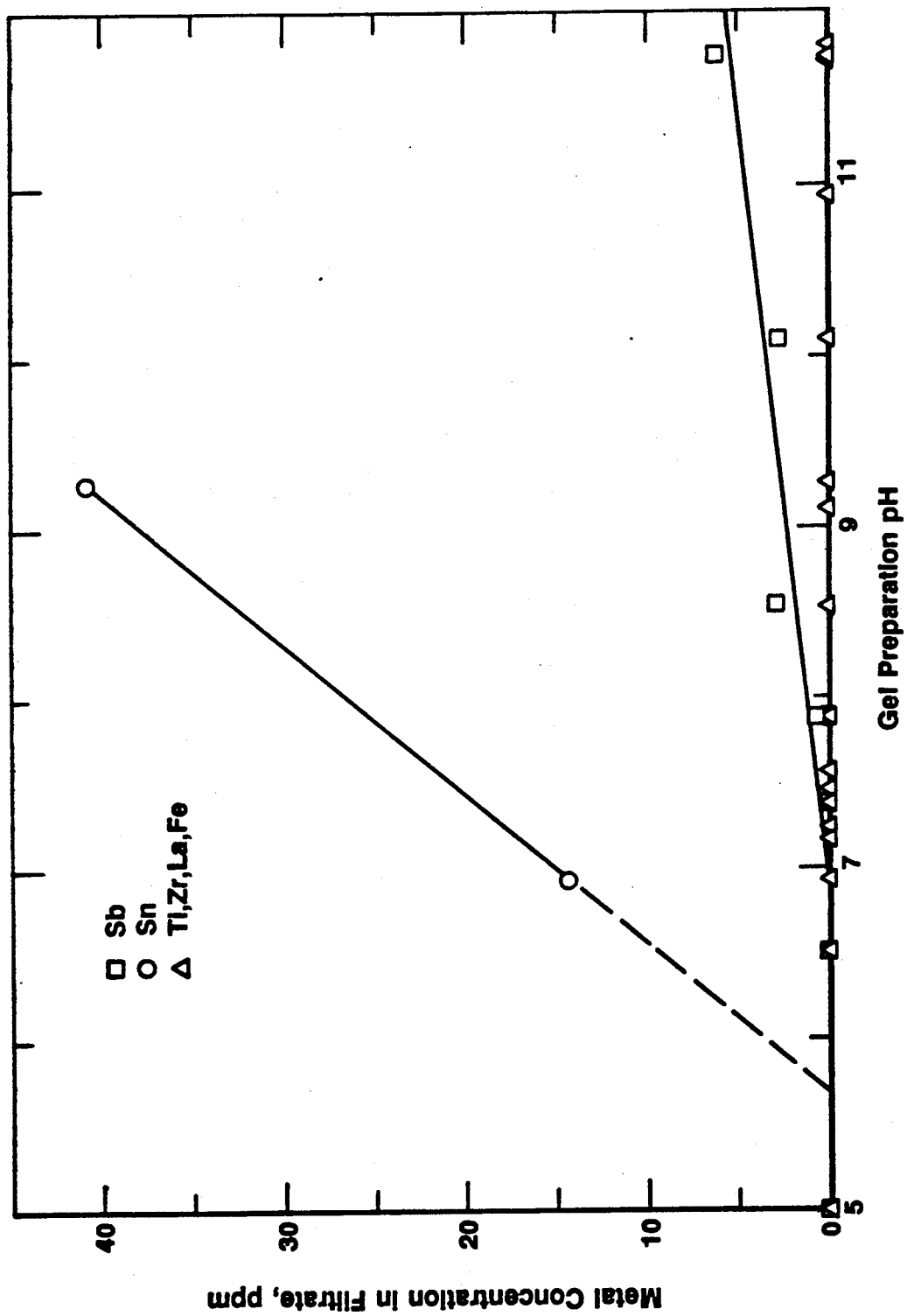
Fig. 1A. ICP Analysis of Spent Hydrothermal Solutions

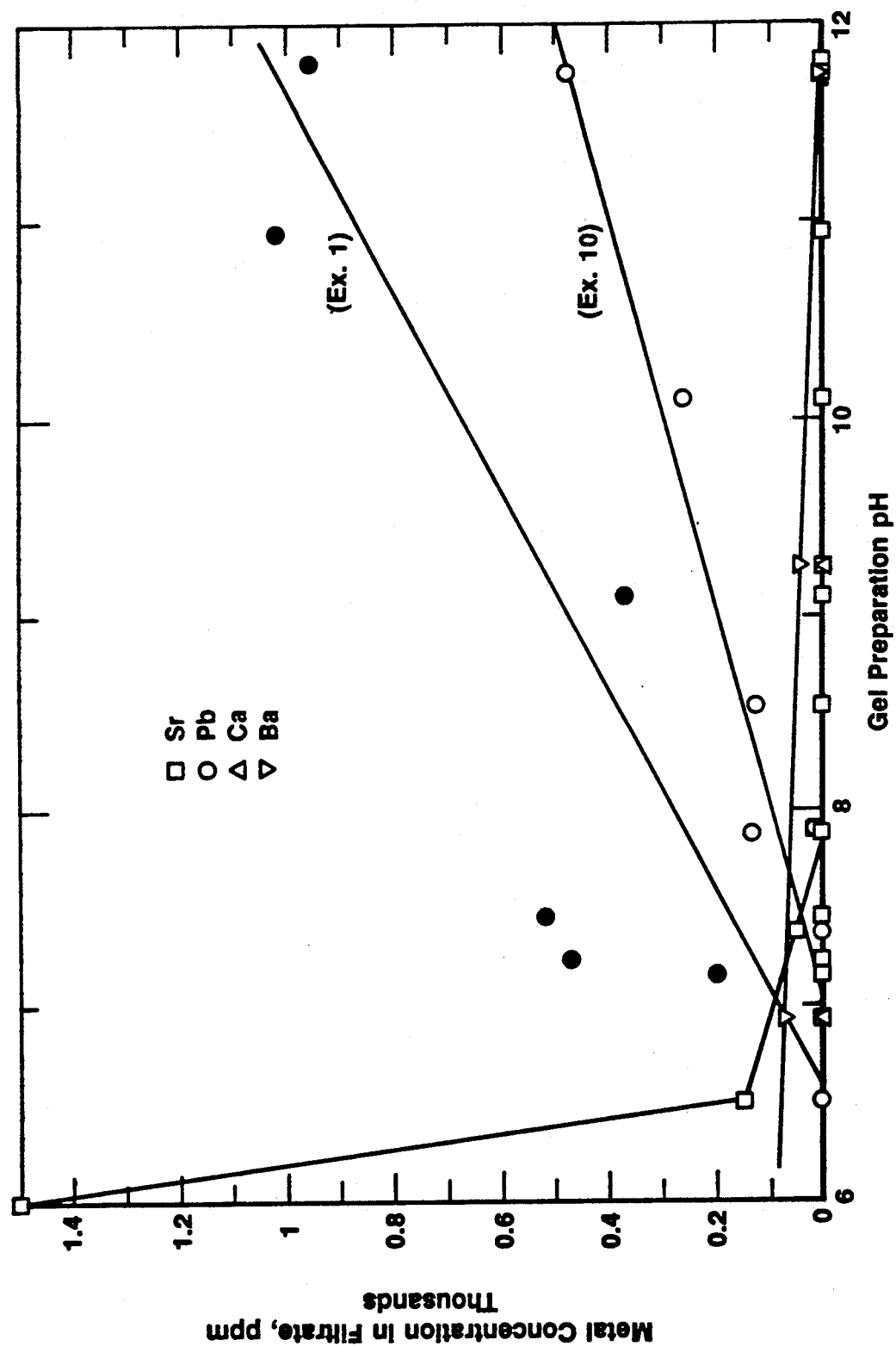
Fig. 1B. ICP Analysis of Spent Hydrothermal Solutions

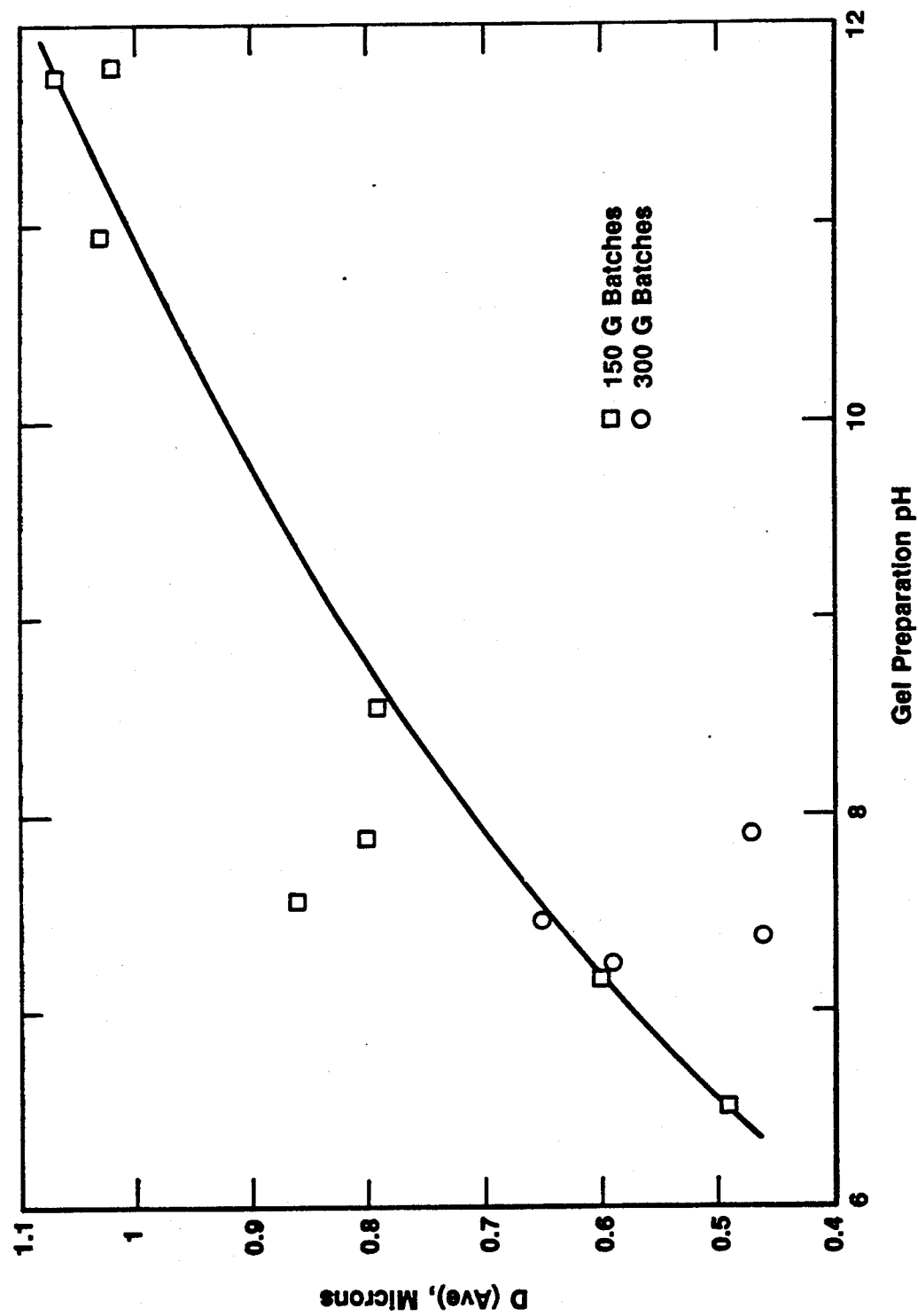
Fig. 2. Average PZT Particle Size Versus Gel Preparation pH

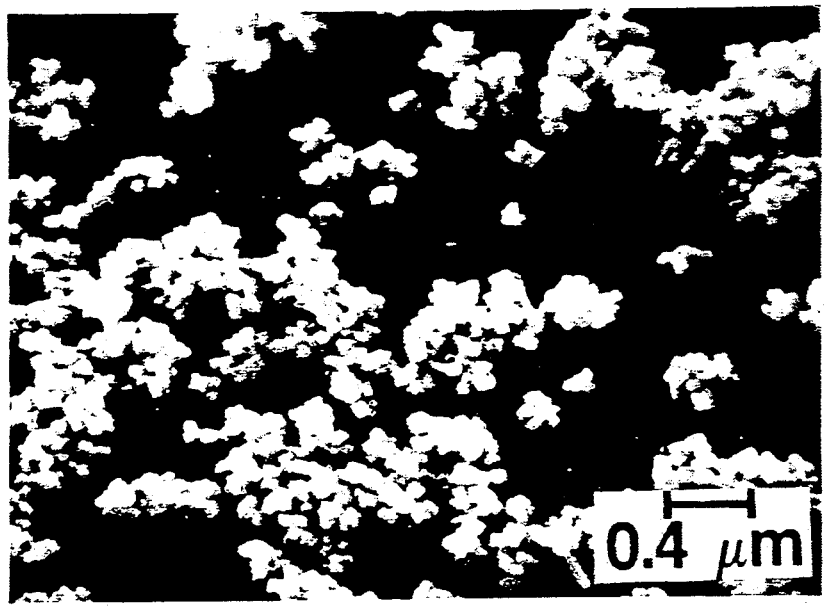
Fig. 3A. Hydrothermally Prepared PZT Powders (Example 1)
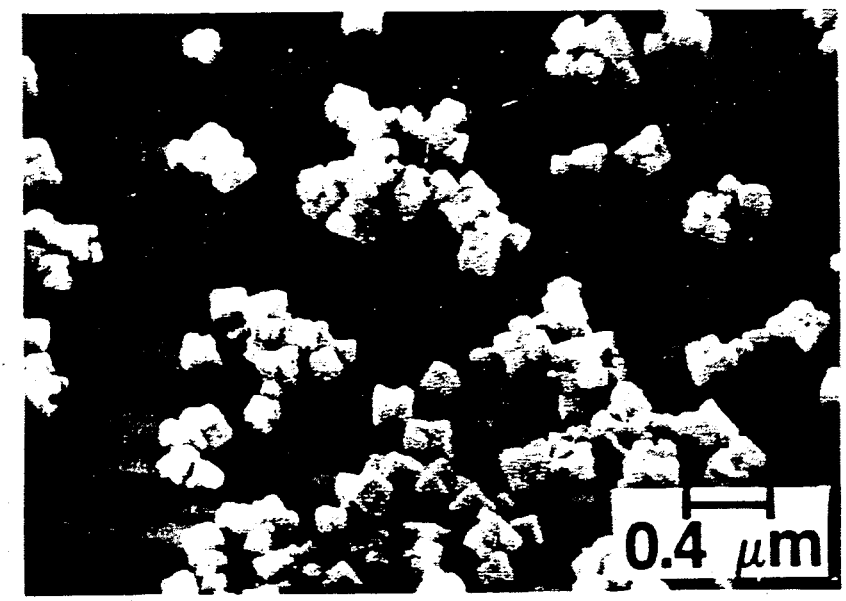
Fig. 3B. Hydrothermally Prepared PZT Powders (Example 3)

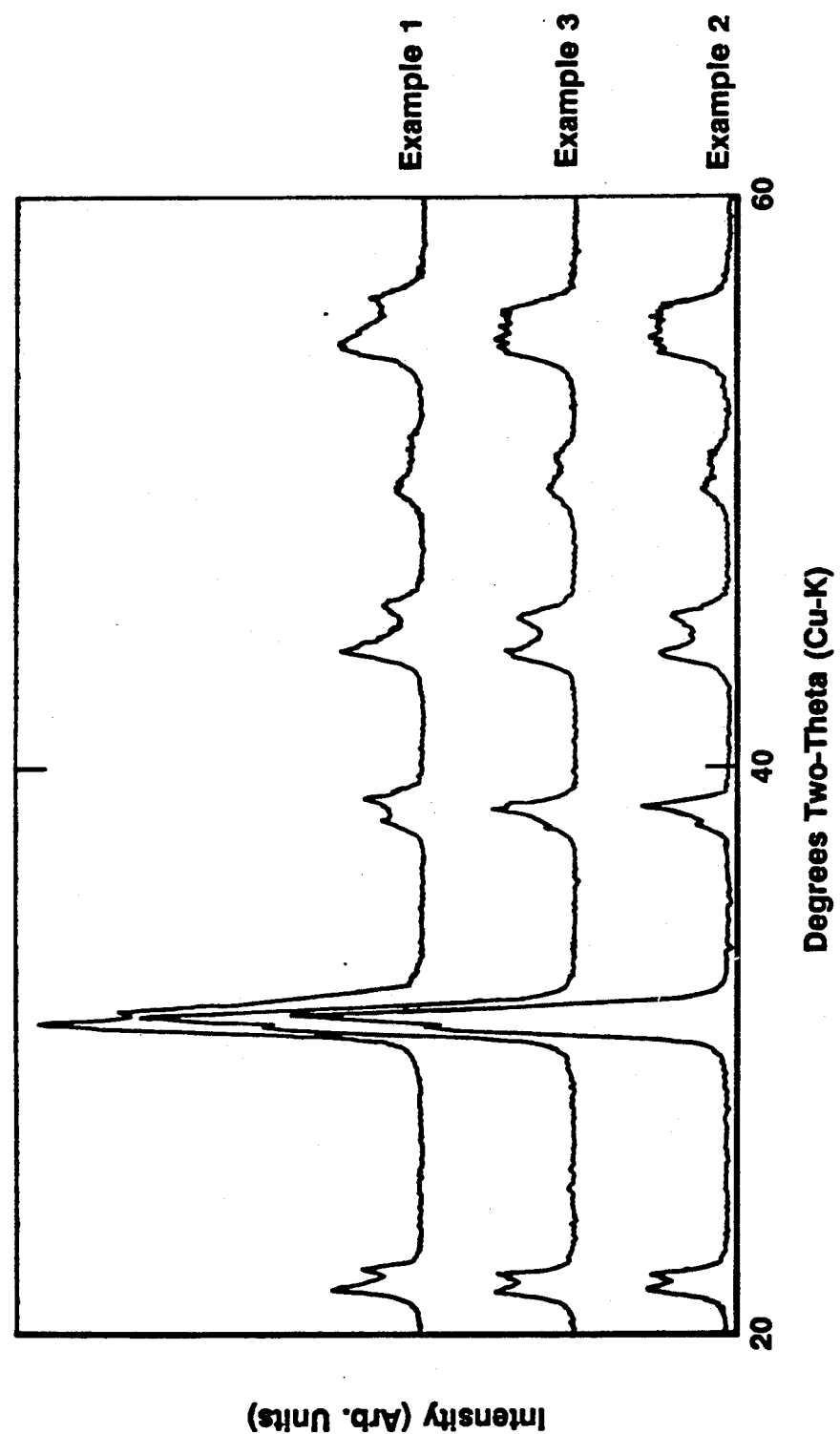
Fig. 4. X-Ray Diffraction Patterns of Hydrothermal PZT Powders: (Examples 1 through 3)

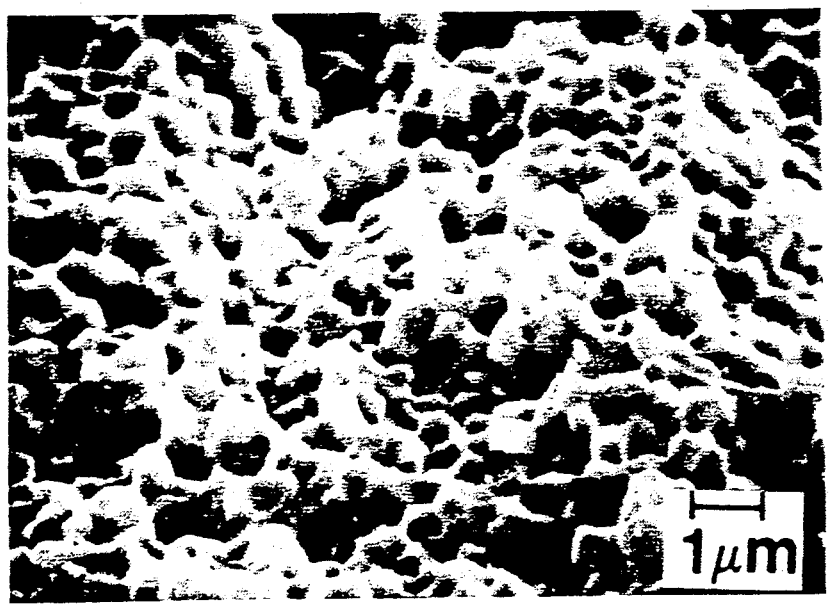
Fig. 5A. Fracture Specimens of Sintered Powder (Example 1)
Fig. 5B. Fracture Specimens of Sintered Powder (Example 2)

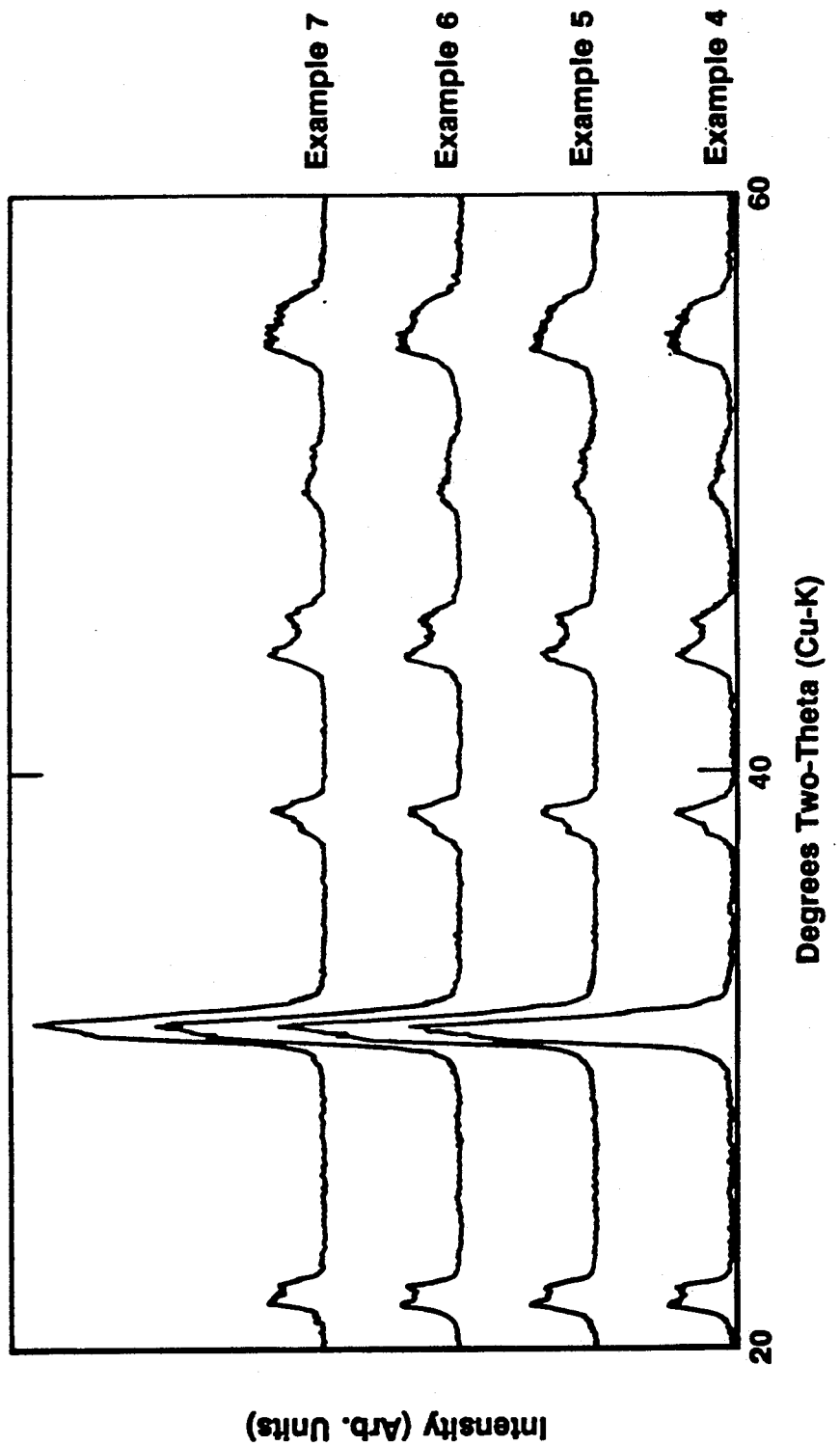
Fig. 6. X-Ray Diffraction Patterns of Hydrothermal Powder Samples Taken After 0, 15, 30, and 60 minutes at 300 C (Examples 4 through 7)

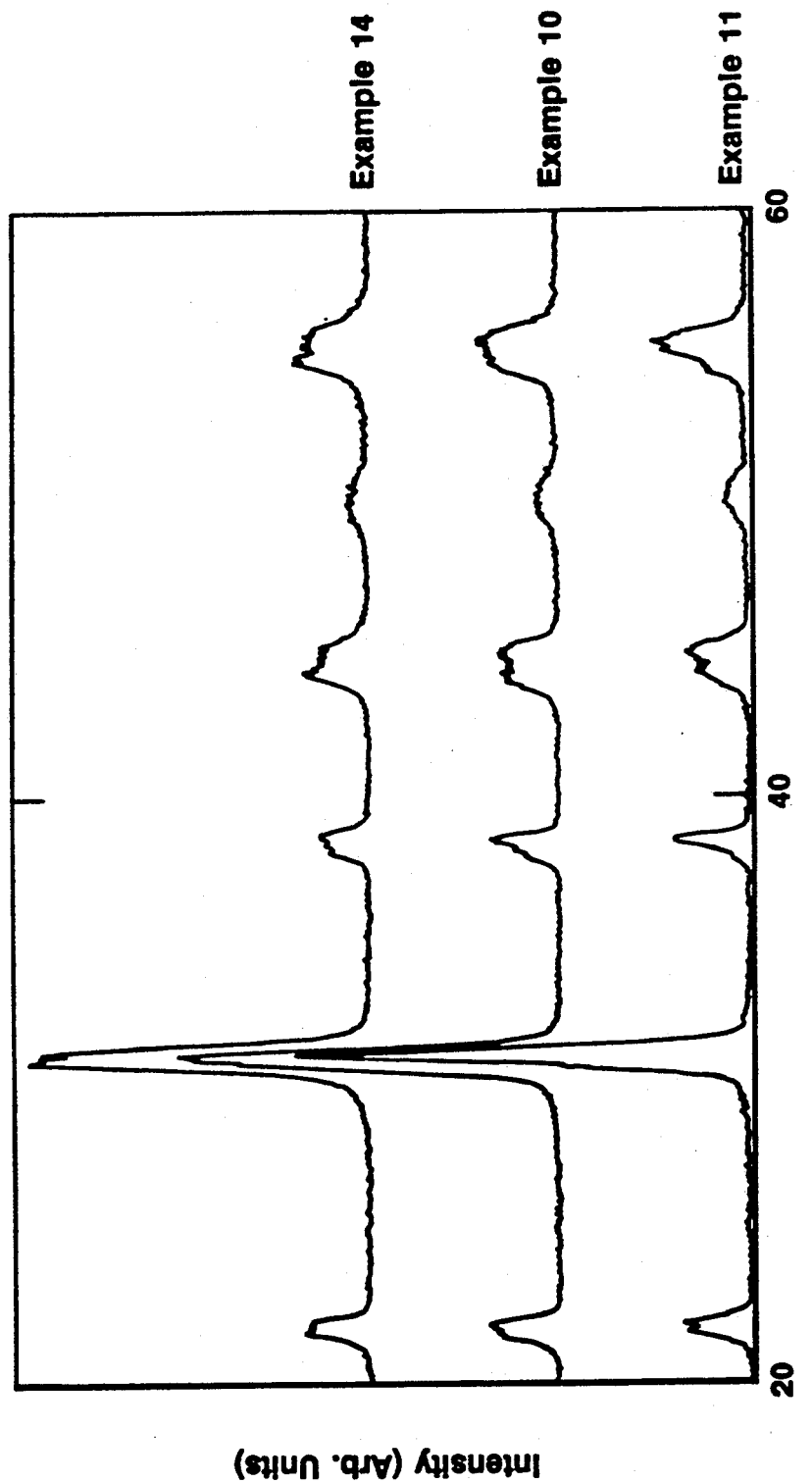
Fig. 7. X-Ray Diffraction Patterns of Hydrothermal PZT Powders (Examples 11, 10, and 14)

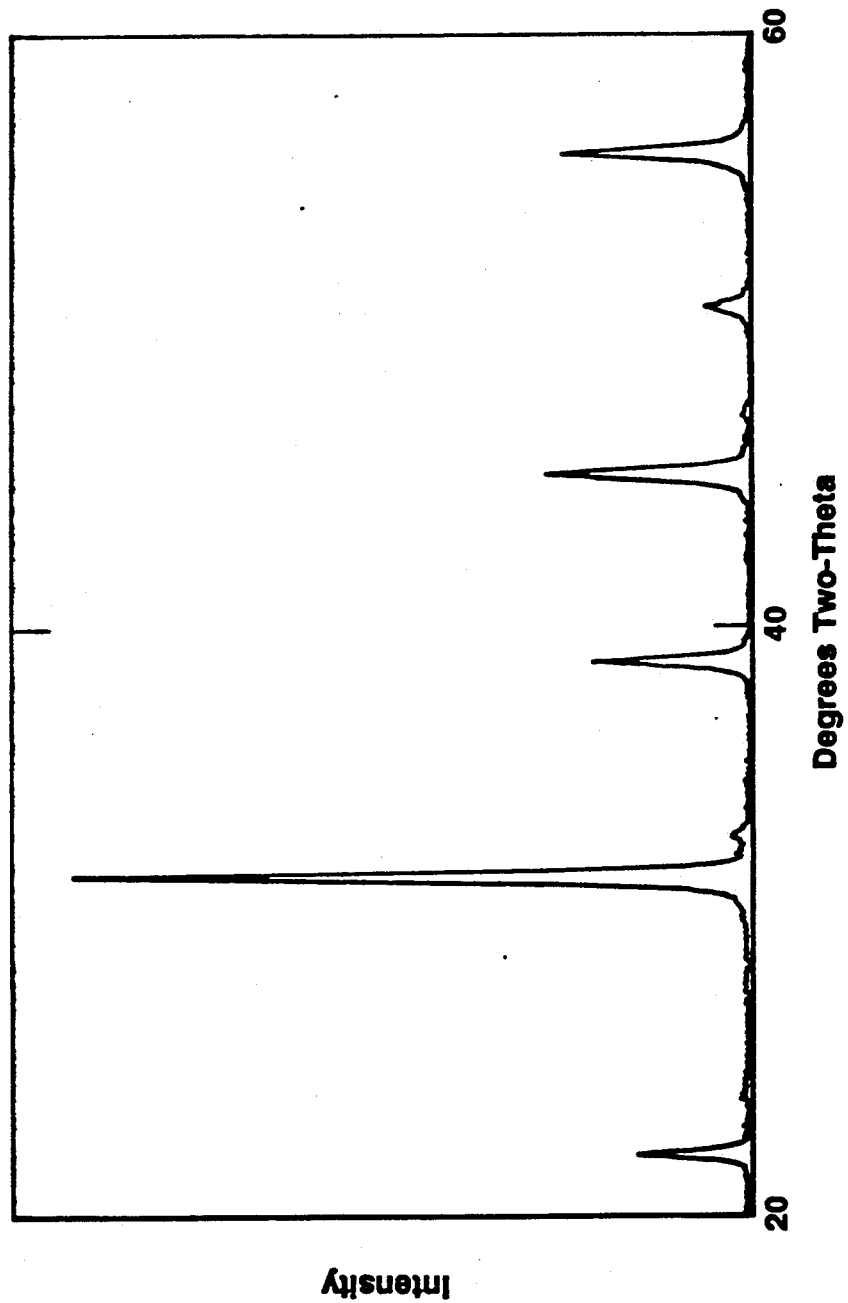
Fig. 8. XRD Pattern of Powder from Example 16

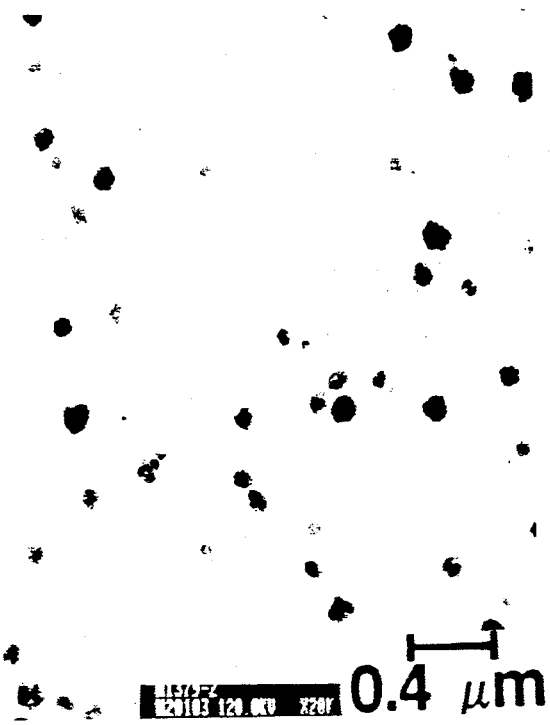
Fig. 9A. Hydrothermally Prepared Powders (Example 16)
Fig. 9B. Hydrothermally Prepared Powders (Example 17)

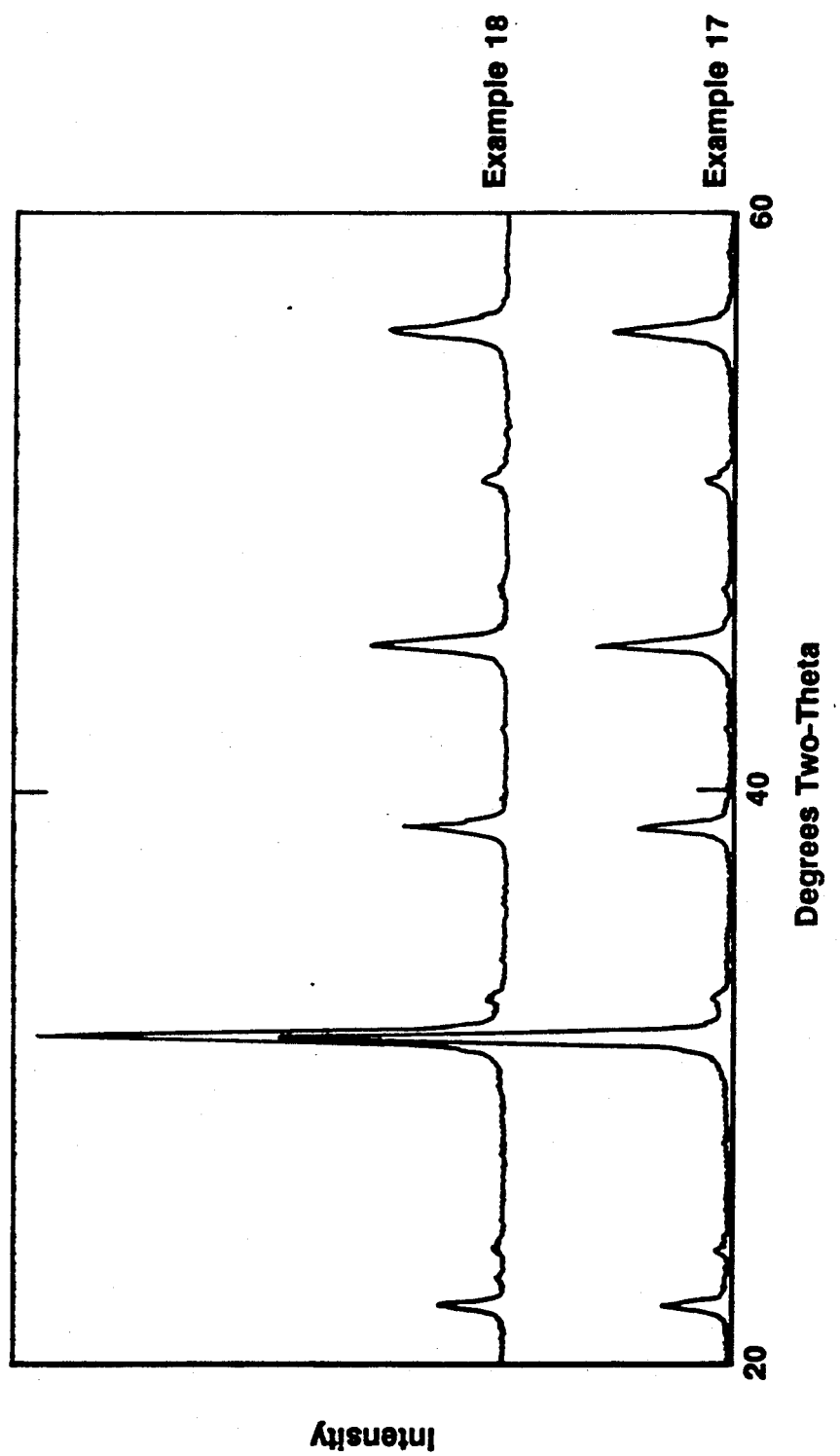
Fig. 10. XRD Pattern of Examples 17 and 18 Powders

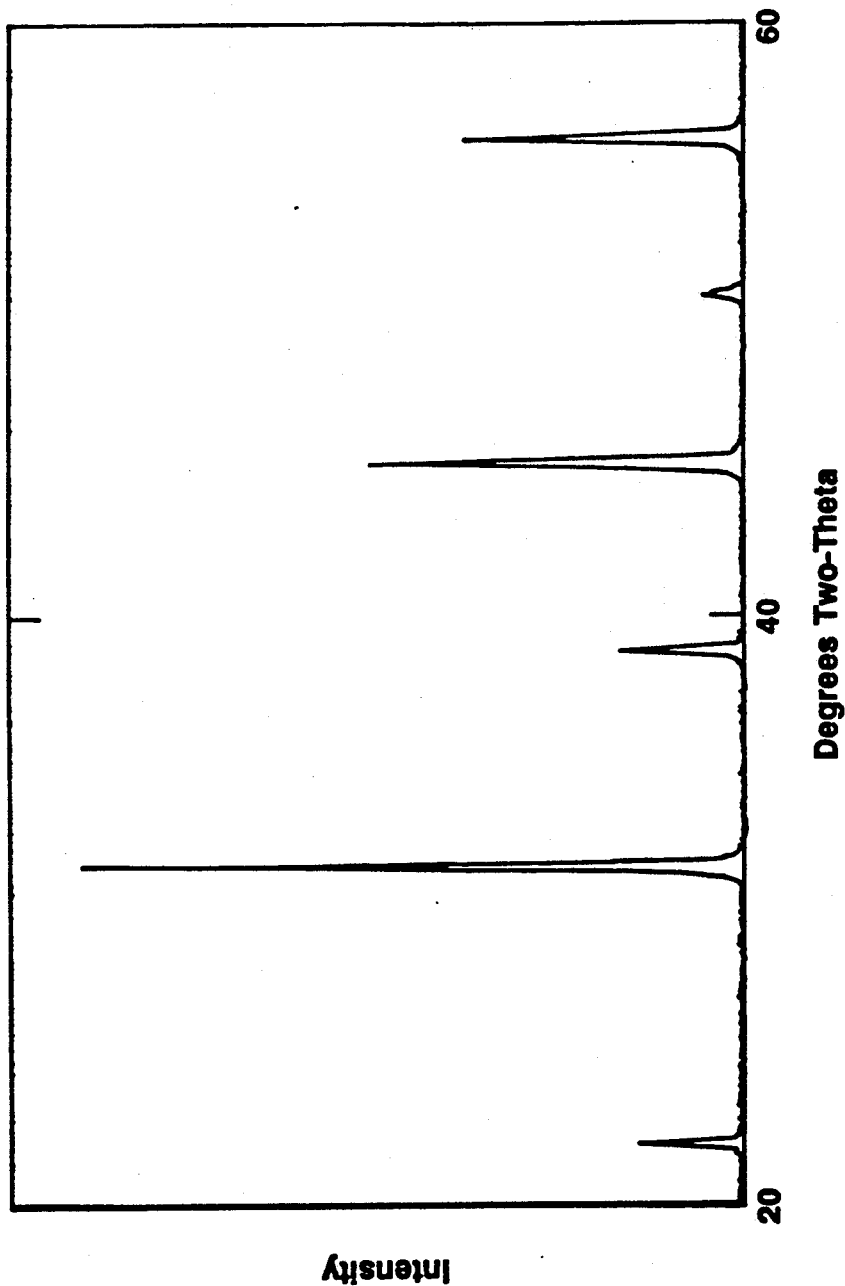
Fig. 11. XRD Pattern of Example 17 Powder Sintered at 1200 C

PROCESS FOR PRODUCING SUB-MICRON CERAMIC POWDERS OF PEROVSKITE COMPOUNDS WITH CONTROLLED STOICHIOMETRY AND PARTICLE SIZE

FIELD OF THE INVENTION

The present invention relates to a process for making perovskite, $ABO_3$, ceramic powders. The powders may comprise single crystal, solid solution particles, and may also contain other secondary ingredients, such as dopants and solid solution substitutions on the A and/or B sites, that alter electrical properties. The powders have utility in numerous electronic applications as, for example, dielectric ceramics, piezoelectric materials, electrostrictive ceramics, and transparent electrooptic ceramics.

BACKGROUND OF THE INVENTION

The present invention involves a process that can be used to produce oxide ceramic powders for various applications. Some of the most commercially important oxide ceramics have the perovskite structure. Perovskite compounds have the general formula $ABO_3$, where the A cation is relatively large and of low valence (such as $Ba^{2+}$, $Sr^{2+}$, $Ca^{2+}$, $Pb^{2+}$, $La^{3+}$, $Sm^{3+}$, $Nd^{3+}$, $Bi^{3+}$, $K^+$, etc.), and the B cation is relatively small and of high valence (such as $Ti^{4+}$, $Zr^{4+}$, $Sn^{4+}$, $W^{6+}$, $Nb^{5+}$, $Ta^{5+}$, $Fe^{3+}$, $Mn^{3+}$, $Mg^{2+}$, $Zn^{2+}$, $Ni^{2+}$, etc.). perovskite ceramics have numerous commercial applications, mainly because of their useful electronic properties. These applications include: dielectric ceramics for capacitors; piezoelectric materials for transducers and sensors; electrostrictive ceramics for micropositioners and actuator devices; and transparent electrooptic ceramics for information storage and optical signal processing. A good discussion of perovskite structure is given in the June, 1988 issue of Scientific American, PEROVSKITES, pages 74 to 81, in article by Robert M. Hazen.

The perovskite structure as typified by $BaTiO_3$ above 135° C. has a cubic structure. This structure consists of a regular array of oxygen ions at the corners, small tetravalent titanium ions in the center, and big, divalent barium ions located at the face centers. In ferroelectric perovskite compounds, the perovskite structure is distorted at low temperatures, and exhibits tetragonal, orthorhombic, or rhombohedral symmetry. At higher temperatures, the structure transforms to cubic; this transition temperature from the distorted phase to the cubic phase is called the Curie point. Ferroelectric behavior is caused by distortions in the crystal lattice caused by shifts in the position of the central cation (i.e., the Ti ion in $BaTiO_3$); this results in a displacement of the centers of positive and negative charge of the ions within the structure and thus a net (or "spontaneous") polarization of the structure. The electrical properties are significantly affected by ferroelectricity in perovskites, giving rise to useful dielectric, piezoelectric, and electrooptic properties. The electrical properties of perovskites can be tailored to those required for a specific application by the wide range of compositional substitutions that are possible. The electrical properties of perovskite ceramics are also affected by manufacturing and processing conditions, as more fully described below.

The requirements of a powder for the numerous electric applications of perovskite ceramics depend on the specific material and its application. However, in most applications, the "ideal" powder is considered to have a fine particle size, narrow or no particle size distribution, chemical homogeneity, controlled stoichiometry, equiaxed particle shape, and to be agglomerate free. After a powder has been prepared, several processing steps are required to form the powder into a shape and to densify it into a finished functional electrical ceramic element. A powder is first formed or compacted into a partially dense shape called a green body. The exact shape depends on the electrical element's intended function and application, e.g., an electromechanical transducer or a multilayer ceramic capacitor. Once the powder is formed into a green body (e.g., by dry pressing or tape casting), the part must be densified by hot pressing, sintering, or the like. Sintering involves heating the green body to high temperature and allowing densification to occur by diffusional processes. The sintering conditions, e.g., time, temperature, pressure, and atmosphere, are dictated by the nature of the starting powder, the powder compaction, and the desired microstructure (e.g., grain size, microstructural uniformity and distribution of secondary phases) of the electrical ceramic elements., Some characteristics of the microstructure which can significantly affect the electrical properties of the ceramic element include grain size, grain size distribution, amount and location of porosity, pore size and distribution, and controlled distribution of secondary phases. Sintering is a key aspect of the manufacturing process of ceramic elements and must be controllable to insure that the production of high quality ceramic materials is reproducible. However, reproducibility of the sintering process and the ceramic element is highly dependent on the reproducibility of the powder production.

Dielectric ceramics, such as barium titanate ($BaTiO_3$) and other titanate based compositions, are used widely for various types of capacitors (multilayer, chip, disk, grain boundary layer, etc.). These dielectric ceramics are important because they have very large dielectric constants, and the compositions and ceramic microstructures can be designed so that the dielectric constant is relatively temperature-independent. The desired electrical properties for capacitor applications can be achieved in $BaTiO_3$ ceramics by solid solution additions of other perovskite compounds such as $SrTiO_3$, $CaTiO_3$, $BaZrO_3$, and $BaSnO_3$, or through addition of dopants such as Mg, Ni, La, Bi, Sm, Ng, Ta, etc. The properties of $BaTiO_3$ ceramics are further improved by optimizing the microstructure (i.e., grain size, microstructural uniformity, controlled distribution of secondary phases, etc.).

Dielectric powders currently used in multilayer ceramic capacitors are prepared by conventional ceramic processing techniques, and thus require high sintering temperatures (>1300° C.). These powders also have large particle size thus requiring that the thickness of each dielectric layer in a multilayer ceramic capacitor must be at least 25 microns. An advanced dielectric powder with fine particle size (<1 micron) and lower sintering temperatures (<1100° C.) would be beneficial. The finer particle size will allow for improved volumetric efficiency of the capacitor, and the lower sintering temperature will allow the use of less-expensive internal electrode materials.

Perovskite ceramics based on $BaTiO_3$ are also useful for several sensor applications, i.e., PTCR devices. The BaTiO$_3$ ceramic grains can be made semiconductive by doping with appropriate amounts of elements such as Nb, or La. These semiconducting BaTiO$_3$ ceramics exhibit an increase of resistivity of several orders of magnitude of the Curie temperature. The temperature range of this resistivity anomaly in BaTiO$_3$ can be shifted by compositional substitutions of Sr (to shift the Curie point to lower temperature) or Pb (to shift the Curie point to higher temperature). This positive temperature coefficient of resistivity (PTCR) effect can be utilized in several sensor/control or heating element applications.

The piezoelectric effect, is a tensor property that relates a microscopic strain (or displacement) of a material with an applied electric field. The piezoelectric effect is useful for several transducer and sensor applications. Very strong piezoelectric effects can be induced in ferroelectric perovskite ceramics, ceramic, by application of an electric field. The electric field polarizes (or "poles") the ceramic by partially aligning the directions of spontaneous polarization within each grain of the ceramic, resulting in a net polarization and piezoelectric activity. Most piezoelectric ceramic applications are based on perovskite solid solutions between PbZrO$_3$ and PbTiO$_3$, or Pb(Zr,Ti)O$_3$. The term PZT is used herein to describe the entire family of powders comprised of lead, zirconium, titanium and oxygen as principal elements and including such compounds wherein some of the principal elements have been replaced by other elements such as dopants and solid solution substitutions.

Compositional modifications can be made to PZT to tailor the piezoelectric properties for specific applications. For instance, the precise Zr/Ti ratio impacts the location of the composition relative to the morphotropic phase boundary, and thus has a large impact on the properties of PZT. Also, the piezoelectric properties are significantly affected by dopant additions such as iron, manganese, lanthanum, antimony, niobium, and tantalum. Solid solution substitutions of barium or strontium (for lead) and tin (for zirconium) can be made to PZT to further alter the piezoelectric properties.

Commercial PZT ceramic parts manufacturers have experienced high rejection rates which can be related to poor batch-to-batch reproducibility of the PZT powder. Lower sintering temperatures of PZT powders would significantly reduce the problem of PbO volatility, and simplify the ceramic processing. Property enhancements would also be expected if PZT powders with more homogeneous solid solutions and more uniform dopant distribution were available.

Relaxor ferroelectrics are a relatively new class of PbO-based complex perovskites, with the general formula Pb(B$_1$,B$_2$)O$_3$, where the B$_1$ cation can be one of several low valent cations (e.g., Mg$^{2+}$, Zn$^{2+}$, Ni$^{2+}$, Fe$^{3+}$, etc.), and the B$_2$ cation is of higher valence (e.g., Nb$^{5+}$, Ta$^{5+}$, W$^{5+}$, etc.). These materials have promise for dielectric (e.g., capacitor), piezoelectric, and electrostrictive actuator (e.g., micropositioner) applications, depending on composition.

Compositions of interest for dielectric applications are based on PbMg$_{1/3}$Nb$_{2/3}$O$_3$ (PMN) with solid solution additions of PbTiO$_3$ and/or PbZn$_{1/3}$Nb$_{2/3}$O$_3$ (PZN). PMN-based ceramics have higher dielectric constants than the BaTiO$_3$-based dielectrics, and thus have the potential for improved volumetric efficiency. In addition, these PbO-based ceramics sinter at lower temperatures (<1000° C.), so that when used in multilayer capacitor applications, the use of less expensive electrode materials will be possible.

Electrostriction is a phenomenon that occurs in all materials, and relates strain to an applied electric field. It differs from piezoelectricity in that the electrostrictive strain is proportional to the square of the electric field, whereas piezoelectric strain is directly proportional to the electric field. In most materials, electrostrictive strain is extremely small and thus cannot be used in transducer applications. However, the electrostrictive strains generated in some relaxor ferroelectrics are comparable with piezoelectric strains in PZT ceramics. Electrostrictive materials can be used in devices where more precise motion control is required. Compositions used for electrostrictive devices are based on PMN in solid solution with PbTiO$_3$.

The ceramic processing of relaxor ferroelectrics by conventional milling and calcination techniques is difficult, and this has limited their applications potential. For example, it is extremely difficult to produce PbMg$_{1/3}$Nb$_{2/3}$O$_3$ by conventional mixed oxides processing due to the formation of a stable Pb-niobate pyrochlore phase during calcination. Repeated calcination at high temperature (1000° C.) is required to form the PMN powder. Another complication of conventional mixed oxides processing arises from the required high calcination temperature; the volatility of PbO alters the stoichiometry and prevents complete reaction. A two-step formation sequence in which the columbite MgNb$_2$O$_6$ is first formed and then reacted with PbO to form PMN has been developed. However, the requirement to first produce a precursor powder complicates the processing and limits the ultimate process control. Advanced powder preparation techniques (such as coprecipitation) have not been successful in the preparation of phase-pure PMN ceramic powders.

Perovskite ceramics based on lead lanthanum zirconate titanate, (Pb,La)(Zr,Ti)O$_3$ or PLZT, are useful because they can be prepared in transparent form with good electrooptic properties. The electrooptic effect relates to a change in refractive index with an applied electric field. Thus PLZT electrooptic ceramics can be used in several optical applications, including shutters, modulators, displays, color filters, image storage devices, and linear gate arrays for optical data processing.

The key to achieving transparency in PLZT ceramics is to produce a pore-free ceramic with uniform microstructure. Starting with a PLZT powder (which can be prepared by several methods), transparent PLZT ceramics are typically produced by hot pressing or liquid-phase sintering. Hot pressing involves the application of pressure at high temperature. The pressure enhances the densification, and pore-free PLZT ceramics can be prepared. With the liquid phase sintering technique, an excess of PbO is added to the PLZT powder prior to sintering. The PbO melts during sintering, forming a liquid phase which facilitates densification into a pore-free ceramic. As sintering takes place, the excess PbO evaporates from the ceramic; the sintering operation is then carried out until none of the excess PbO remains.

The first step to both of the above fabrication techniques, powder processing, is crucial to the optical quality of the final transparent PLZT ceramic. The optical quality of PLZT ceramics produced from conventionally prepared powders is limited. Improvements in optical quality of hot pressed PLZT ceramics have been demonstrated using chemically coprecipitated PLZT powder. However, both the prior art methods suffer from agglomeration and purity limitations.

Several investigators have reported the use of a hydrothermal treatment step to produce anhydrous crystalline products, including perovskite compounds. Recently, emphasis of research has been on dielectric barium titanate compounds and piezoelectric lead zirconate titanate (PZT) compounds. These investigations have all shown that sub-micron crystalline products can be formed.

It was reported by K. Abe et al, U.S. Pat. No. 4,643,984, that perovskite compounds with the general formula $ABO_3$ could be produced using a three step procedure. The first step involved subjecting a mixture of A and B hydroxides to hydrothermal reaction in an aqueous media. Next, an insolubilizing agent, such as carbon dioxide, was added to the reacted mixture so as to precipitate unreacted A element materials to adjust the A to B stoichiometry. This step was necessary due to the soluble nature of the A elements, including lead, strontium, calcium, barium and magnesium, under the conditions of the hydrothermal treatment. The mixture formed after the second step contains both a B-rich crystalline oxide phase formed during the hydrothermal reaction and an A-rich non-crystalline, non-oxide phase formed during the second step. Alternatively the product slurry of the hydrothermal reaction was first filtered and washed, and then added to an aqueous medium containing the supplemental A elements. The product stoichiometry could then be adjusted by adding an insolubilizing agent. The final step was to filter and wash the product with the corrected A to B elemental ratio. This process was demonstrated for the preparation of compounds containing the A elements listed above and the B elements titanium, zirconium, hafnium, tin.

Although the process described by Abe et al was shown to result in the formation of compounds with the desired stoichiometries, several problems are expected from the method of production. The primary problem is the method chosen to control the A to B elemental ratio. It would be much more desirable to produce a compound in the hydrothermal treatment step which is already a full solid solution of the exact desired stoichiometry. The second step in the process described above not only adds impurities which can be detrimental to the ceramic sintering step, it also introduces inhomogeneities to the product. The washing steps are expected to remove some of unreacted A elements. This problem is most severe for compounds containing lead and strontium on the A-site.

Several investigators have reported a similar process for producing perovskite compounds in which the salts, or in some cases hydroxides or carbonates, of many of the A and B constituents are combined in an aqueous mixture. The mixture is adjusted to a basic pH through the addition of an alkaline material or ammonia. This mixture is then reacted under hydrothermal conditions to produce the crystalline perovskite compounds. The product slurry is cooled, filtered and washed with water to remove impurities remaining from the salts and the pH adjusting compounds. Examples of processes which employ these general steps have been reported by Fuji Titan Kogyo Co., Japanese patent number JP61031345 Yonezawa, et al U.S. Pat. No. 3,963,630, and D. Watson et al, Proceedings of the First International Conference on Ceramic Powder Processing Science, Orlando, 1987.

The Japanese patent reported that barium and strontium titanate could be produced by this method with high yield and complete incorporation of the A site elements, strontium and barium, presumably at a reaction pH of much greater than seven. However, complete incorporation of strontium and barium is possible as long as the reaction is operated under alkaline conditions and in the absence of chloride. The problem with this approach, however, is that other elements including lead and antimony could not be completely incorporated because of the presence of anionic impurities (chlorides or nitrates) and due to the alkaline pH condition. Another problem is the introduction of unsuitable quantities of sodium impurities into the reaction product which arises from the high concentration of sodium hydroxide employed in the reaction.

In the second investigation, by Yonezawa, et al, complex lead zirconate titanate compounds were produced. In this process, an acidic aqueous solution of the positive elements consisting of lead, titanium, zirconium, manganese, antimony, niobium, and tantalum was prepared with predetermined mole ratios. The solution was neutralized by use of NaOH, KOH or $NH_4OH$ to a neutral or slightly basic pH. The mixture was then directly reacted in an autoclave at temperatures between 150° C. and 300° C. The resultant product was cooled, and the precipitate was filtered from the solution and washed to remove impurities. The product was reported to have a high yield although the filtrate was analyzed and found to contain concentrations of unreacted lead, titanium, zirconium, manganese and antimony ions of 30, 40, 800, 400 and 1500 parts per million. For electronic applications, these solution losses are highly significant and can adversely affect electrical properties due to loss of control over product stoichiometry. The solution losses are a direct result of the anionic impurities left in the reacting solution. Other problems associated with the solution losses include disposal of hazardous effluents or increased plant complexity to provide for recovery of these elements. Because the cationic impurities were not removed before the hydrothermal reaction, it is expected that the products would contain excessive amounts of sodium or potassium. These impurities are detrimental to the sintering properties of the powder and the electrical properties of the sintered ceramics. Finally, because the ionic impurities were not removed in the above examples, exotic materials of construction would be required for the hydrothermal reactor to prevent corrosion associated with high temperature aqueous solutions containing chloride, nitrate and ammonium ions. This increases equipment costs and increases the possibility of product contamination.

In the work by Watson, et al, the formation conditions for lead titanate were determined under hydrothermal conditions. Only analyses of the lead titanate products were reported. Filtrate solutions were not analyzed with respect to lead and titanium ion concentrations, and therefore no conclusion can be made on the yield of the process. However, high levels of lead are expected to remain in the solution phase in the presence of high concentrations of either chloride or hydroxide ions in the hydrothermal reaction. This results in a product with a poorly defined A to B stoichiometry. The products formed by Watson, et al were particles of non-uniform shape and size. These type of particles are typical if chloride ions are not removed from the precipitated solution prior to hydrothermal reaction.

Another hydrothermal process for production of PZT compounds was described by K. Beal in a presentation at the American Ceramic Society Conference in Boston, August 1986. In this process, the zirconium and titanium were dissolved and neutralized. The resultant mixed hydroxide precipitate was then filtered and washed extensively to remove all traces of ionic impurities. The hydroxide gel was then mixed with lead oxide and reacted in an aqueous slurry by a hydrothermal reaction. It was determined that at a temperature of 300° C., reaction to the desired perovskite crystalline powder would not occur unless significant quantities of mineralizers were added. These mineralizers included the fluorides and hydroxides of potassium, sodium and lithium. These mineralizers were shown to introduce significant concentrations of impurities to the resultant PZT products. These are expected to be detrimental to the sintering and electrical properties of the target ceramics. Also, the problem of hydrothermal corrosion is expected to be severe in the presence of such mineralizers.

Kutty, et al have described the preparation of several perovskite materials including PZT (Materials Research Bulletin, Vol. 19, pp. 1479-1488, 1984), strontium titanate (mater. Res. Bull., Vol. 22, pp. 641-650, 1987), and Ba(Ti,Zr)O$_3$ (mat. Res. Bull., Vol. 22, pp. 99-108, 1986). In this work, hydroxide gels were prepared by neutralization of an acidic salt solution of the B elements. The gels were washed to remove ionic impurities and were mixed with oxides or hydroxides of the A elements. The slurries were then reacted under hydrothermal conditions to form the sub-micron powders of the desired compounds. The concentrations of unreacted A and B elements were not determined in this work, so it is impossible to discern whether complete reaction took place. In fact, excess amounts of A element were added, and the products were then leached with acid to remove water insoluble byproducts and to adjust the product A to B stoichiometry.

Other investigators have employed organic precursors as a feed material for a hydrothermal synthesis process. These materials add excessive cost to the process and also introduce carbon based impurities which are detrimental to the sintering properties of perovskite compounds. Examples of such processes include those reported by K. Abe, et al, U.S. Pat. No. 4,643,984.

SUMMARY OF THE INVENTION

It is an object of the present invention to provide a single crystal, solid solution, chemically homogenous powder of a perovskite compound of predetermined average particle size and composition having useful electrical properties and the general formula, ABO$_3$, where A is primarily of the group barium, lead, strontium, and lanthanum, and B is primarily of the group titanium, zirconium, niobium, and niobium and magnesium, and wherein the A and/or B sites may have dopants and solid solution substitutions that provide useful electrical properties. The powders have reduced sintering temperatures and controlled particle size distributions. The average particle size may be controlled by adjusting the pH at which the powder is made.

A further object of the invention includes an improved process for making a crystalline ceramic powder having a perovskite structure, ABO$_3$, including the steps of preparing a first acidic solution containing one or more elements selected from the group consisting of hafnium, zirconium, titanium, niobium, tantalum, uranium, iron, antimony, lanthanum, bismuth, thorium, indium, nickel, manganese, neodymium, samarium, cobalt, tungsten, and tin, vanadium, dysprosium, praseodymium, yttrium, promethium, europiem, cerium, ytterbium, lutetium, scandium, gadolinium, terbium, holmium, erbium, thulium, chromium, potassium, and lithium; preparing a second basic solution containing a sufficient concentration of hydroxide to provide a predetermined pH when mixed with the first solution; adding the first acidic solution to the second basic solution to precipitate a substantially pure mixture of hydroxides; washing the precipitate to remove hydroxide and salt impurities that solubilize lead or other constituent elements of the powder; preparing an aqueous slurry of the washed precipitate and adding oxides or hydroxides of one or more of the elements selected from the group consisting of barium, strontium, calcium magnesium, lead, zinc, yttrium, magnesium, manganese, cobalt, zinc and nickel; hydrothermally treating the slurry at an elevated temperature and pressure for a time sufficient to form the powder; and drying the powder; wherein when lead, zirconium and titanium are selected the perovskite has the general formula: Pb(Zr$_{1-x}$Ti$_x$)O$_3$, wherein x has a value of:

(1) between 0 and 0.44;
(2) between 0.44 and 0.55, and a total dopant and solid solution substitution level between 13 and 50 mole percent;
(3) between 0.55 and 1.00; and wherein when x has a value of (1) or (3) then the total dopant and solid substitution level ranges from 0 to 50 mole percent.

When the hydroxide of the second basic solution is selected from the group consisting of sodium hydroxide, ammonium hydroxide, and potassium hydroxide, with the proviso that when manganese, nickel, or cobalt are selected in step (a) ammonium hydroxide is not selected.

The process can include the step of controlling the pH to select the average particle size of the powder.

In another embodiment the first acidic solution is added to the second basic solution at a predetermined pH ranging from about 4 to about 12.

In general lead zirconate powders produced by this method have an average particle size of less than 2 microns. More specifically, the powder has a primary crystallite size ranging from about 0.20 microns to about 0.60 microns, and a secondary particle size ranging from about 0.4 microns to about 2.0 microns.

BRIEF DESCRIPTION OF THE DRAWINGS

FIGS. 1A and 1B show the relationship between unreacted element concentrations and precipitation pH.

FIG. 2 shows the relationship between precipitation pH and the agglomerate size of PZT powders.

FIGS. 3A and 3B respectively show scanning electron micrographs (magnified 25,000×) of powders produced in Examples 1 and 3 and which depict the effect of reaction pH on particle morphology of PZT powders.

FIG. 4 depicts the x-ray diffraction patterns of hydrothermally prepared PZT powders according to Examples 1, 2 and 3.

FIGS. 5A and 5B respectively show scanning electron micrographs (magnified 10,000×) of fracture specimens of ceramics produced by sintering powders according to Examples 1 and 2.

FIG. 6 depicts the x-ray diffraction patterns of hydrothermally prepared powders according to Examples 4–7.

FIG. 7 represents the x-ray diffraction patterns of hydrothermally prepared powders according to Examples 10, 11 and 14.

FIG. 8 depicts the x-ray diffraction pattern of the powder from Example 16.

FIGS. 9A and 9B respectively show transmission electron micrographs (magnified 20,000×) of hydrothermally prepared powders according to Examples 16 and 17.

FIG. 10 depicts the x-ray diffraction patterns from the powders of Examples 17 and 18.

FIG. 11 depicts the x-ray diffraction pattern of the powder produced according to Example 17.

DETAILED DESCRIPTION OF THE INVENTION

The process of the invention is for making perovskite, $ABO_3$, ceramic powders which consist of single crystal, solid solution particles, containing dopant oxides and solid solution substitutions useful in commercial applications, and having a primary crystallite size less than 0.4 microns and a secondary particle size of less than 2 microns. Compounds included are those containing any or all of the A elements: barium, strontium, calcium, magnesium, lead, lanthanum, bismuth, cerium, neodymium, samarium and any or all of the B elements hafnium, zirconium, titanium, tantalum, niobium, uranium, iron, antimony, nickel, manganese, cobalt, tungsten, and tin. These powders can be sintered at 100° to 400° C. below the sintering temperature of standard ball-milled and calcined powders to ceramics exhibiting uniform microstructures and homogeneous chemical compositions. The powders are expected to result in electrical properties superior to those of traditional electronic ceramics.

Compounds of particular interest that can be produced by this method include (1) those in the family of lead zirconate titanate (PZT); (2) those in the family of lead titanate (PT); (3) those in the family of lead lanthanum zirconium titanate (PLZT); (4) those in the family of barium titanate (BT); (5) those in the family of lead magnesium niobate (PMN); and (6) those in the family of lead zinc niobate (PZN).

Specific compositions with regard to PZT include the perovskite compound $PbZr_{1-x}Ti_xO_3$, wherein:

(1) between 0 and 0.44;
(2) between 0.44 and 0.55, and a total dopant and solid solution substitution level between 13 and 50 mole percent;
(3) between 0.55 and 1.00; and wherein when x has a value of (1) or (3) then the total dopant and solid substitution level ranges from 0 to 50 mole percent.

Specific composition with regard to PT include the perovskite compound of $PbTi_1O_3$, with the Pb and Ti partially substituted by zero, one or more of the elements: calcium, samarium, neodymium, lanthanum, barium, strontium, tungsten, nickel, cobalt, iron, manganese, tin, zirconium, niobium, and tantalum.

Specific compositions with regard to PLZT include the compound $Pb_{1-x} La_x Zr_{1-y} Ti_y O_3$ wherein the values of x range from 0 to 0.20 and the values of y range from 0.20 to 0.44.

Specific compositions with regard to BT include the composition $BaTiO_3$, wherein the barium and titanium are partially substituted by zero, one or more elements from the group consisting of calcium, strontium, lead, tin, magnesium, nickel, zinc, cobalt, niobium, tantalum, zirconium, neodymium, samarium, bismuth, and lanthanum.

Specific compositions with regard to PMN include the composition $PbMg_{1/3}Nb_{2/3}O_3$, wherein the lead, magnesium and niobium are partially substituted by zero, one or more elements from the group consisting of nickel, iron, manganese, zinc, tantalum, tungsten, tin, titanium, zirconium, strontium, calcium, barium, and lanthanum.

Specific compositions with regard to PZN include the composition $PbZn_{1/3}Nb_{2/3}O_3$, wherein the lead, zinc, and niobium and partially substituted by zero, one or more elements from the group consisting of nickel, iron, manganese, magnesium, tantalum, tungsten, tin, titanium, zirconium, strontium, calcium, barium, and lanthanum.

The method is also applicable to other commercially important perovskite compounds.

Specific applications include: (1) piezoelectric ceramic transducer elements made from PZT and PT powders; (2) multilayer ceramic capacitors from BT, PMN, and PZN powders; (3) electrooptic ceramic devices from PLZT and PMN powders; (4) PTCR ceramic devices from BT powders; and (5) electrostrictive ceramic actuator devices from PMN and PZN powders.

The major steps in the process are:

(1) Acidic salts including chlorides, oxychlorides, and/or nitrates are dissolved in an acid/water solution to form an acidic solution of any or all of the following: hafnium, zirconium, titanium, niobium, tantalum, uranium, iron, antimony, lanthanum, bismuth, thorium, indium, nickel, manganese, neodymium, samarium, cobalt, tungsten, and tin, vanadium, dysprosium, praseodymium, yttrium, promethium, europium, cerium, ytterbium, lutetium, scandium, gadolinium, terbium, holmium, erbium, thulium, chromium, potassium, lithium, wherein the elements are in the proper ratio to obtain the desired stoichiometry of the final composition;

(2) The dissolved salt solution is added slowly to a vigorously mixed, basic solution containing a predetermined concentration of one, all or any of the hydroxides of sodium, ammonium and potassium until a pH value between 4 and 12 is reached. The precise pH value is dependent on the constituents dissolved in step (1) and on the desired particle size. For lead containing compounds, for example, the ph must be below 7.5 in order to obtain nearly complete reaction of lead oxide in step (5), for strontium and barium containing compounds, the pH must be greater than 6.5 to achieve nearly complete incorporation of these components. The pH value of the mixed hydroxide slurry also affects, to a lesser extent, the incorporation levels of antimony and tin. Manganese, chromium, nickel, and zinc are expected to be likewise affected. This method of precipitation results in the formation of a mixed hydroxide precipitate containing all of the above mentioned metal hydroxides in a homogeneous mixture. The pH can be adjusted, within the range allowable to achieve complete reaction, in order to control the particle size of the reacted product. Ammonia (or ammonium hydroxide is not used when manganese, nickel, or cobalt are selected in step (1). The pH influences product morphology. Those skilled in the art can readily vary pH to increase or decrease.

(3) The mixed metal hydroxide is separated from the resultant salt solution and is washed with purified water until the chloride, nitrate, and free hydroxide contents of the hydroxide gel are to a sufficiently low level to favor complete incorporation of all constituents into the oxide phase in step (5). for example, after three washes the specific conductivity of the wash filtrates were less than about 2 mmho.

(4) The washed hydroxide gel is then redispersed in water and is vigorously mixed until a homogeneous slurry with a pH of between 10.0 and 13.0 is formed with the remaining perovskite components including oxides and/or hydroxides of the following: barium, strontium, calcium, magnesium, lead, manganese, cobalt, zinc, yttrium, and nickel in the proper ratio to produce a mixture with a stoichiometry equal to the desired $ABO_3$ stoichiometry of the target perovskite composition.

(5) The homogeneous slurry is hydrothermally treated. It is introduced into a pressure reactor, which can be either a stirred autoclave or a plug flow vessel, and is heated to a temperature between 100° and 350° C., depending on the composition of the target composition, under the vapor pressure of the solution or in the presence of an oxidizing gas for less than 30 minutes. It is then cooled to below 100° C., and is removed from the pressure vessel.

(6) The crystalline solids formed in the reaction are separated from the liquid phase which is essentially free of soluble oxide components and is washed to remove any remaining ionic impurities. Finally the washed solids are dried. The solids have essentially the same metal ion stoichiometry as the feed material for the process.

(7) When lead, zirconium and titanium are selected the levels of precursors are selected to obtain a perovskite that has the general formula:

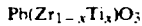

$Pb(Zr_{1-x}Ti_x)O_3$ where x has a value of:
a. between 0 and 0.44;
b. between 0.44 and 0.55, and a total dopant and a solid solution substitution level of 13 to 50 mole percent;
c. between 0.55 and 1.00; and
d. when the compound has the value of a or c then the total dopant and solid solution substitutions may range from 0 to 50 mole percent.

This process differs significantly from the previous state-of-the-art process technology. Specifically, the process involves the use of pH in step (2) to control both the extent of incorporation of elemental constituents and the particle size of products formed in step (5). The procedures employed in steps (1), (3) and (4) are essential to take advantage of this method. By removing impurities in step (3), the products formed in step (5) are essentially completely reacted crystalline compounds containing all of the A and B constituents in the same stoichiometry as the feed material. In the prior art, the materials produced did not contain all of the added constituents due to incomplete reaction. This invention also entails the use of pH in both steps (2) and (4) to control the particle size of the hydrothermally produced powder. Particle size can be controlled in the range of 0.04 to 1.2 microns, depending on pH and composition.

Products formed by this method have been demonstrated to be reactive toward sintering. For example, lead zirconate titanate (PZT) powders have been produced, containing strontium, iron and lanthanum, which were sintered to greater than 98 percent theoretical density at 900° C. This is a reduction in temperature of approximately 400° C. A demonstration on the use of the method for reduction of sintering temperature of barium titanate-based dielectric compositions has also been shown.

Products which can be produced and improved by this method include: barium titanate powders including all or any of the dopant metal oxides listed in steps (1) and (4) above; lead zirconate titanate formulations with or without dopants, lead lanthanum zirconium titanate formulations (PLZT); lead titanate and lead titanate doped with any of the materials listed in steps (1) and (4); and other perovskite compounds containing any or all of the elements listed in steps (1) and (4) in the proper stoichiometry.

Advantages obtained by this improved process include reduced reaction temperature and time and improved control over product stoichiometry and particle size. Advantages of the improved product powders are uniform, controlled fine particle size, improved sintering reactivity, improved chemical homogeneity, reduced impurity contamination, and controlled agglomeration. These advantages are expected to result in the manufacture of electronic ceramics with improved structural and electrical properties by processes which are less polluting, more reliable and therefore more economical.

Evidence has been collected in experimental investigations that expands the current understanding of the hydrothermal process with respect to the control of the A to B elemental ratio. In previous patents, e.g., that by K. Abe, et al. it was considered as inevitable that a portion or all of the A elements would remain as soluble species in the hydrothermal reaction. Therefore, measures had to be taken after the reaction to correct the product stoichiometry. The present invention avoids this problem by process conditions for nearly complete incorporation of all elements of a complex perovskite compounds.

The expanded understanding of the invention reactions was derived from a detailed study of the neutralization (or coprecipitation) step employed in all similar hydrothermal processes (step (2) from above). It was determined that the conditions under which the precipitation is carried out has a significant impact on the stoichiometry of the final product. Specifically, for example, it has been shown that the primary B constituents, zirconium and titanium, can be codissolved and neutralized to hydroxides over a wide range of pH. This pH range has been demonstrated to cover 6.0 to 11.7 and is expected to extend to at least 4 and 12 based on known solubility relationships. Likewise, many of the dopant elements: niobium, tantalum, manganese, zinc, antimony, lanthanum, iron, uranium, chromium, can be coprecipitated over all or a portion of this pH range. Since the coprecipitated mixture is washed to remove ionic impurities after the coprecipitation step, it was not expected that the coprecipitation pH would have any effect on the incorporation of these elements in the hydrothermal reaction. This, however, is not the case. Other elements, including strontium, barium, lead, magnesium and calcium are not added in step (1) because of the relatively narrow range of pH under which they can be precipitated.

Several experiments have been carried out for hydrothermal production of perovskite compounds containing the elements: titanium, zirconium, lanthanum, iron, antimony, tin, calcium, strontium, and lead and barium. Titanium, zirconium, lanthanum, iron, antimony and tin were added in the first process step as chlorides or oxychlorides. Sr and Ba were added in step (4) as crystalline hydroxides and Ca and Pb were added as CaO and PbO also in Step (4). Chemicals were analyzed for oxide content by various chemical methods. The acidic salt solution was first prepared and was then slowly added to a solution of sodium or potassium hydroxide, which contained the proper concentration of these bases to reach a desired pH endpoint. Experiments were carried out over the range of pH from 6.0 to 11.7. The coprecipitation is preferably carried out in a blender or mixer which provides sufficient agitation to ensure a uniform solution composition throughout. In these experiments, the blending speed was varied from 3000 to 6000 rpm. As an alternative, the sodium hydroxide or potassium hydroxide solution can be added to the acidic solution to cause the coprecipitation. This has been found, however, to result in products which do not sinter as readily. This is presumably due to the creation of inhomogeneities in the precursor hydroxide gel. As the basic solution is added, the least soluble hydroxide will precipitate first, followed by the next least soluble and so on. The result is a mixture of several separate hydroxide components in the precursor gel. On the other hand, if the acidic solution, containing all of the coprecipitation components, is added to the basic solution, an atomically mixed hydroxide is formed. This is caused by the instantaneous precipitation of the mixture as it comes in contact with the basic solution.

After the desired pH endpoint was reached, the hydroxide was separated from the solution by filtration or centrifugation. The filtrate or centrate was analyzed by inductively coupled plasma (ICP) analysis to determine the extent of precipitation for each of the elements. In the pH range of 6.00 to 11.73, it was verified that zirconium and titanium are essentially completely precipitated. Iron, antimony and lanthanum were also precipitated under the conditions studied. Only tin was found to remain partially soluble at a pH of 11.80. Table 1 summarizes the results of the coprecipitation experiments.

TABLE 1

CONCENTRATION OF ELEMENTS REMAINING IN FILTRATES FROM COPRECIPITATION PROCEDURE VERSUS COPRECIPITATION pH

| SAMPLE NO. | FILTRATE pH | CONCENTRATION, PPM | | | | | |
|---|---|---|---|---|---|---|---|
| | | Zr | Ti | Fe | Sb | La | Sn |
| A | 6.00 | <1 | <1 | N/A | <1 | N/A | N/A |
| B | 6.93 | <1 | <1 | N/A | N/A | <1 | <1 |
| C | 9.10 | <1 | <1 | <1 | N/A | <1 | N/A |
| D | 9.25 | 1.12 | <1 | N/A | N/A | N/A | <1 |
| E | 9.60 | <1 | <1 | N/A | <1 | N/A | N/A |
| F | 11.55 | <1 | <1 | N/A | N/A | N/A | 369 |
| G | 11.73 | <1 | <1 | N/A | N/A | N/A | N/A |
| H | 11.80 | <1 | <1 | <1 | N/A | <1 | N/A |

N/A — Not applicable

After completing steps (1) and (2), the precipitated mixture was washed with purified water to remove ionic impurities. This was accomplished by blending the gel with a volume of distilled water equal to two-thirds the volume from which it was formed. Blending is continued for 10 to 20 minutes, and the gel is again separated from the wash liquid. This procedure can be repeated to remove additional salts. It has been shown that three wash cycles were sufficient to remove essentially all of the leachable salts. Purified water includes distilled and deionized water.

The gel was then redispersed in water and the remaining components added to the mixture. These components can include oxides or hydroxides of barium, strontium, lead, magnesium and calcium. In general, these compounds are mildly basic and will increase the pH of the mixture to between 10 and 13, depending on the concentration.

The mixture is then introduced to an autoclave or other pressure containing vessel. The slurry is heated to the reaction temperature which can be as low as 100° C. or as high as 350° C., depending on the composition of the perovskite being formed. After reaching the reaction temperature, a short hold period may be utilized; although, it has been demonstrated that this may not be necessary. For example, fully developed PZT compositions have been produced at 300+ C. without any hold period. The need for a holding period can be readily determined by those skilled in the art. The slurry is then cooled to below 100° C., and the product powder is separated from the liquid phase by centrifugation, filtration or settling.

The filtrates or centrates were analyzed by ICP to determine concentrations of unreacted components. Complete incorporation of all elements is essential to the control of the product stoichiometry. It was determined that the concentration of unreacted components was strongly related to the pH at which the precursor hydroxide gel was precipitated in step (2). FIG. 1 shows the relationship between unreacted element concentrations and coprecipitation pH. Lead and antimony have increased solubility levels, when the coprecipitations were carried out at elevated pH values. On the other hand, the solubilities of barium and strontium increase with decreasing pH. Incorporation levels of zirconium, titanium, lanthanum, iron, and calcium were not affected by coprecipitation pH in the ranges investigated.

Coprecipitation pH was also found to affect both the size of the crystallites formed in the hydrothermal reaction and the size of agglomerates formed. FIG. 2 shows the relationship between coprecipitation pH and the agglomerate size of PZT powders. The agglomerate size was determined by ultracentrifugation in a Horiba particle analyzer. The crystallite size was also affected as can be seen in the scanning electron micrographs shown in FIG. 3. The average crystallite size was roughly doubled when coprecipitation pH was increased from 7.16 to 10.94.

These results have dramatically altered our view on the use of the hydrothermal process for preparation of electronic ceramic powders. The primary concern in preparation of these materials has been control of stoichiometry. Because of the investigation into the incorporation of elements as a function of processing conditions, it is now possible to specify conditions for each processing step depending on the target composition. For example, to produce a compound $(Ba,Sr)TiO_3$, one must perform the coprecipitation step within a pH range of roughly 7 to 12. The particle size of the products can be controlled by selecting a pH within this range. This allows one to have some additional control over the formation of the ceramic microstructure in the sintering step. To produce a compound $(Ba,Sr,Pb)TiO_3$, the coprecipitation pH must be close to 7, in order to preserve the control over product stoichiometry. Addition of zirconium, lanthanum or iron to either of these compounds does not change the conditions under which the process may be carried out. Likewise, all other elements which can be incorporated into the perovskite structure should have similar solubility relationships. By determining these relationships, one can define sets of conditions for production of any perovskite material, using the six step process of the invention.

Ranges of pH in step (2) have been determined which result in complete or near complete incorporation of A and B site cations into the perovskite structure in step (5). For example, it has been shown that in the compound $(Pb,Sr)(Zr,Ti,Sb)O_3$, each of the elemental constituents has a pH range in which it is 100 percent incorporated. Values of 4 and 12 have been selected as the boundaries of the acceptable pH range since many of the elements of interest have appreciable solubility beyond these bounds. Therefore, pH bounds can be set for each element in the compound within this range. The approximate boundaries that have been determined as shown in Table 2.

TABLE 2

| | pH in STEP (2) | | | | | | | |
|---|---|---|---|---|---|---|---|---|
| | 4 | 5 | 6 | 7 | 8 | 9 | 10 | 11 | 12 |
| Pb | ]**********---] | | | | | | | |
| Sr | | | | ]------------------------] | | | | |
| Zr | ]**********-------------------------------] | | | | | | | |
| Ti | ]**********-------------------------------] | | | | | | | |
| Sb | | | | ]------------------------] | | | | |

Optimum pH
ELEMENTAL INCORPORATION VERSUS
GEL PREPARATION pH
(DASHED LINES ARE EXPERIMENTAL;
ASTERISKS ARE PREDICTED)

Lead is fully incorporated when gels are prepared at pH levels below approximately 6.5. Strontium has a pH range of 7 to 12 and antimony has a pH range of 6.5 to 12. According to this data, the pH condition which will result in optimum incorporation of all elements is between 6.5 and 7.0. Inside of this range, minor concentrations of strontium, and lead will remain in the hydrothermal solution phase. However these levels are minimized, because of methods employed to ensure complete precipitation. For example, to incorporate greater than 99.8 percent of all elements, the acceptable pH range could be increased to between 6.5 and 8. In this pH range, slight adjustments can be made in the feedstock stoichiometry in steps (1) and (4) above to account for solution losses.

It has been determined that similar incorporation relationships can be determined for other elements employed in the perovskite structure. These relationships are thought to be dependent on the solubility of perovskite compounds in the hydrothermal solutions from which they are formed. Hydroxide gel pH affects the solubility relationships, probably due to the influence of free hydroxide and other anionic species which remain in the gel after washing. For example, relationships have been determined for barium, strontium, lead, calcium, tin, titanium, zirconium, antimony, lanthanum and iron. These are summarized in Table 3. By matching the pH range of perovskite elements, a high yield product of well defined stoichiometry can be produced for any potential compound.

TABLE 3

| | pH in STEP (2) | | | | | | | |
|---|---|---|---|---|---|---|---|---|
| | 4 | 5 | 6 | 7 | 8 | 9 | 10 | 11 | 12 |
| Pb | ]**********-----] | | | | | | | |
| Sr | | | | ]---------------------------] | | | | |
| Ba | | | | ]---------------------------] | | | | |
| Ca | ]*****************--------------------------] | | | | | | | |
| La | ]**********---------------------------------] | | | | | | | |
| Fe | ]**********---------------------------------] | | | | | | | |
| Zr | ]**********---------------------------------] | | | | | | | |
| Ti | ]**********---------------------------------] | | | | | | | |
| Sn | ]*****************----------] | | | | | | | | pH RANGES FOR NEARLY COMPLETE
(LESS THAN 50 PPM SOLUBILITY)
INCORPORATION INTO PEROVSKITE COMPOUNDS
(DASHED LINES ARE EXPERIMENTAL;
ASTERISKS ARE PREDICTED)

Likewise, given the teachings of this invention it is expected that relationships can be determined for all other elements incorporated into the perovskite structure by an ordinary person skilled in the art. To do this, synthesis experiments need to be performed employing stoichiometrically balanced feedstocks of the compounds of interest. For example, barium titanate formulations can be produced with other dopant elements, including zinc, magnesium, nickel, bismuth, cobalt, tungsten, manganese, niobium, tantalum, samarium, and neodymium as minor substitution elements. The hydroxide gel should be precipitated and washed as described herein. Several pH values should be selected within the range of 4 to 12 to perform the precipitations. Synthesis experiments can then be carried out as a function of hydroxide gel pH. The relationships could then be determined by analyzing product filtrates for all of the elemental constituents.

EXAMPLE 1

A PZT composition was produced with the formula $(Pb_{0.94}Sr_{0.06})(Zr_{0.52}Ti_{0.48})O_3$ and containing minor concentrations of iron and lanthanum as dopants incorporated in the $ABO_3$ perovskite structure. About 150 grams of zirconium oxychloride solution containing 20.45 percent $ZrO_2$ by weight was mixed with about 2.80 grams of a dilute iron(III) chloride solution, about 6.70 grams of a dilute lanthanum chloride solution and about 200 grams of distilled water. The solution was mixed with about 78.6 grams of a titanium oxychloride solution containing about 22.5 percent $TiO_2$ by weight. In a 4-liter capacity blender, a caustic solution was prepared by dissolving about 112.0 grams of a 50 percent by weight NaOH solution in 1500 grams of distilled water.

While blending the caustic solution at a rate of approximately 3000 rpm, the mixed solution containing titanium, zirconium, lanthanum and iron chlorides was slowly poured into it. The hydroxide slurry which was formed was allowed to blend for an additional 15 minutes. The slurry was then filtered through a Buchner funnel, and 1300 ml of clear filtrate was collected with a pH of about 7.16. The precipitate was redispersed in the blender with 1000 ml distilled water and was blended for 20 minutes. It was then recovered by filtration and washed two additional times in the same manner.

The precipitate was again redispersed in 1000 ml water, and about 7.29 grams $Sr(OH)_2 \cdot 8H_2O$ and about 98.94 grams of PbO, including an excess amount added to aid in sintering, were blended in. The slurry was diluted to a total volume of 1.5 liters and the pH was measured to be 11.76.

The slurry was poured into a 3.785-liter capacity stainless steel autoclave, heated to 300° C. over 150 minutes at a stirring rate of 350 rpm and held at temperature for 30 minutes. It was then cooled to 90° C. and removed from the autoclave.

The slurry was immediately filtered, and 1250 ml of clear filtrate were collected. The filtrate was analyzed by ICP and was determined to contain 200 ppm Pb and 2.5 ppm Sr. From these measurements, incorporation levels of Pb and Sr were calculated to be about 99.72 and about 99.87 percent, respectively. All other elements were essentially 100 percent incorporated. The solids were washed in the same manner as the hydroxide gel and then dried in a vacuum oven at 60° C. for several hours. The solids were pale yellow in color and were analyzed by XRD for crystalline phase. The XRD pattern is shown in FIG. 4. The product contains only perovskite structure materials. The average particle size of the powder was determined to be about 0.60 microns and the crystallite size was estimated to be about 0.1 to 0.2 microns based on the SEM micrograph shown in FIG. 3.

The powder was compacted into a small disc using an isostatic press which was then cold isostatically pressed to a green density of about 55 percent. The specimen was sintered at 950° C. for 2 hours to a final density of 7.59 grams/cm$^3$. The microstructure was uniform and had a grain size of about 0.5 to 1.0 microns. An electron microscopic photograph of a fracture specimen of the sintered ceramic is shown in FIG. 5.

EXAMPLES 2-9

Several experiments were carried out using the same general formulation as in Example 1. The conditions employed in each experiment are summarized in Table 4, process variables including reaction time and hydroxide gel preparation pH were varied.

TABLE 4
HYDROTHERMAL SYNTHESIS OF PZT FORMULATIONS CONTAINING IRON(III) AND LANTHANUM AS DOPANTS

| Ex. | Hydroxide Gel pH | Reaction Temp. C. | Reaction Time min. | Concentrations of Unreacted Elements, ppm | | | | | | Products* Avg Particle Size, μm |
|---|---|---|---|---|---|---|---|---|---|---|
| | | | | Zr | Ti | La | Fe | Sr | Pb | |
| 2 | 11.80 | 300 | 30 | <1 | <1 | <1 | <1 | <1 | 958 | 1.02 |
| 3 | 10.94 | 300 | 30 | <1 | <1 | <1 | <1 | <1 | 1020 | 1.03 |
| 4 | 7.56 | 300 | 0 | <1 | <1 | <1 | <1 | 2.34 | 1040 | 0.85 |
| 5 | 7.56 | 300 | 15 | <1 | <1 | <1 | <1 | 1.78 | 970 | 0.85 |
| 6 | 7.56 | 300 | 30 | <1 | <1 | <1 | <1 | 1.56 | 962 | 0.88 |
| 7 | 7.56 | 300 | 60 | <1 | <1 | <1 | <1 | 1.25 | 987 | 0.91 |
| 8 | 7.46 | 300 | 15 | <1 | <1 | <1 | <1 | 2.80 | 520 | 0.65 |
| 9 | 7.24 | 300 | 15 | <1 | <1 | <1 | <1 | 2.61 | 474 | 0.59 |

*All products formed had the perovskite structure.

In Examples 2 and 3, hydroxide gels were prepared in the same manner as in Example 1; however, the pH endpoints for gel preparation were 11.80 and 10.94, compared to 7.16. The average particle sizes of materials produced under these conditions increased from 0.60 to over 1 micron. Primary crystallite sizes were increased from 0.1-0.2 microns to 0.2-0.5 microns, by SEM analysis. Electron microscope photographs of powders produced in Examples 1 and 3 are compared in FIG. 3. The ceramic powders were compacted, as described above and were sintered at 950° C. for 2 hours into dense ceramics. The microstructures of ceramics produced from the Examples 1 and 2 powders are compared in FIGS. 5A and 5B. The grain size of the two specimens was directly proportional to the particle size of the hydrothermally produced powders. This demonstrates the use of the process for controlling ceramic microstructures.

The powders produced in Examples 4 through 7 differed only in reaction time. The perovskite solid solution was formed immediately upon heat up to 300° C. Additional reaction time up to one hour had little effect on the reaction products. XRD patterns of the powders formed in Examples 4 through 7 are compared in FIG. 6.

In examples 4 through 9, high amounts of excess lead oxide were added. These are responsible for the relatively high solution losses in these examples. The remainder of the examples show more clearly the relationship between hydroxide gel pH and solution lead loss. For example, to produce larger particles of PZT, in order to create a large grained microstructure, the hydroxide gel pH should be near the upper end of the range 4 to 12. Minor concentrations of excess PbO must be added to the process in order to compensate for lead losses under these conditions. Lead losses were calculated to be a maximum of 1.53 percent for Example 2, in which the hydroxide gel was produced at a pH of 11.80.

EXAMPLE 10

A PZT composition was produced with the formula $(Pb_{0.88}Sr_{0.12})(Zr_{0.56}Ti_{0.44})O_3$ and containing minor concentrations of antimony as a dopant incorporated in the $ABO_3$ perovskite structure. An amount of about 160 grams of zirconium oxychloride solution containing about 20 percent $ZrO_2$ by weight was mixed with about 9.76 grams of a dilute antimony chloride/hydrochloric acid solution, 200 grams of distilled water, and about 75 grams of a titanium oxychloride solution containing 22.534 percent $TiO_2$ by weight. In a 4-liter capacity blender, a caustic solution was prepared by dissolving 115.00 grams of a 50 percent by weight NaOH solution in 1500 grams of distilled water.

While blending the caustic solution at a rate of approximately 3000 rpm, the mixed solution containing titanium, zirconium, and antimony chlorides was slowly poured into it. The resulting hydroxide slurry was allowed to blend for an additional 15 minutes. The slurry was then filtered through a Buchner funnel, and 1650 ml of clear filtrate was collected having a pH of 7.88. The precipitate was redispersed in the blender with 1000 ml distilled water and was blended for 20 minutes. It was then recovered by filtration and washed two additional times in the same manner.

The precipitate was again redispersed in 1000 ml water, and 14.69 grams $Sr(OH)_2.8H_2O$ and 94.32 grams of PbO, including an excess amount added to aid in sintering, were blended in. The slurry was diluted to a total volume of 1.5 liters and the pH was measured to be 11.78.

The slurry was poured into a 3.785-liter capacity stainless steel autoclave, heated to 300° C. over 150 minutes at a stirring rate of 350 rpm and held at temperature for 30 minutes. It was then cooled to 90° C. and removed from the autoclave.

The slurry was immediately filtered, and 1220 ml of clear filtrate were collected. The filtrate was analyzed by ICP and was determined to contain 135 ppm Pb and 0.35 ppm Sr. From these measurements, incorporation levels of Pb and Sr were calculated to be 99.81 and 99.99 percent, respectively. All other elements were essentially 100 percent incorporated. The solids were washed in the same manner as the hydroxide gel and were then dried in a vacuum oven at 60° C. for several hours. The solids were white in color and were analyzed by XRD for crystalline phase. The XRD pattern is shown in FIG. 7. The product contains only perovskite phases. The average particle size of the powder was determined to be 0.80 microns.

The powder was compacted into a small disc using an isostatic press which was then cold isostatically pressed to a green density of about 55 percent. The specimen was sintered at 950° C. for 2 hours to a final density of 7.45 grams/cm$^3$. The microstructure was uniform and had a grain size of 0.5 to 1.0 microns.

EXAMPLES 11-14

Several experiments were carried out using the same general formulation as in Example 10. The conditions employed in each experiment are summarized in Table 5. Hydroxide gel preparation pH was varied for these experiments.

TABLE 5
HYDROTHERMAL SYNTHESIS OF PZT FORMULATIONS CONTAINING ANTIMONY AS A DOPANT

| Ex. | Hydroxide Gel pH | Reaction Temp. C. | Reaction Time min. | Zr | Ti | Sb | Sr | Pb | Products* Avg Particle Size, μm |
|---|---|---|---|---|---|---|---|---|---|
| 11 | 11.75 | 300 | 30 | <1 | <1 | 6.14 | 1.61 | 480 | 1.07 |
| 12 | 7.90 | 300 | 15 | <1 | <1 | <1 | 19.5 | 13.0 | 0.47 |
| 13 | 7.55 | 300 | 15 | <1 | <1 | <1 | 46.8 | 5.46 | 0.46 |
| 14 | 6.51 | 300 | 30 | <1 | <1 | <1 | 147 | 2.64 | 0.47 |

*All products formed had the perovskite structure.

Perovskite compounds were formed under all conditions. XRD patterns of Example 11 and 14 are shown in FIG. 7. As in the previous examples, as hydroxide gel pH increased, the particle size increased, the degree of lead incorporation decreased and the degree of strontium incorporation increased. It was also shown that antimony incorporation levels decreased as hydroxide gel pH was increased. At the highest gel pH studied, the level of incorporation of lead was reduced to 99.23 percent, and at the lowest pH, it was 99.99 percent. Levels of strontium incorporation ranged from 96.16 to 99.95 percent, particle size increased from 0.47 to 1.07 microns over the hydroxide gel pH studied. The ceramic formed from the powder produced in Example 11 showed increased grain size from that of example 10, when sintered under identical conditions.

EXAMPLE 15

The PZT composition from Example 1 was mixed with 20 percent by weight solution of polyvinyl alcohol (PVA) so that the PVA content was 3.20 percent by weight. The mixture was then dried at 80° C., ground with mortar and pestle, and sieved through a 40 mesh screen. Pellets of between 1.1 and 1.3 grams were uniaxial pressed in a 0.55 inch diameter steel die at a pressure of 10,000 psi, and then isostatically pressed at 55,000 psi. The binder was burned out by heating at 100° C. per hour to 600° C. and holding for four hours. The pellets produced in this manner had average green densities of 4.63 g/cm$^3$.

The pellets were sintered on an alumina plate separated by a thin layer of zircon sand. About 4 grams of PbZrO$_3$ powder was packed into four small Pt boats and these boats were placed on the alumina plate; this PbZrO$_3$ powder provide a PbO atmosphere during sintering. A 100 cc alumina dish was used as a cover. Sintering of the pellets was done by heating to a temperature between 900° and 1000° C. with a heating rate between 50° and 200° C. per hour and holding for a time between 1 or 2 hours. The sample weights were recorded before and after sintering and the weight loss was calculated. The densities were measured using the Archimedes method with isopropyl alcohol as the solvent. Sintering data is presented in Table 6 below:

TABLE 6

| Temp (°C.) | Time (hr) | Rate (°C./hr) | Weight loss (%) | Density (g/cm$^3$) |
|---|---|---|---|---|
| 900 | 1 | 50 | 0.51 | 7.59 |
| 950 | 1 | 50 | 0.68 | 7.58 |
| 950 | 2 | 50 | 0.72 | 7.59 |
| 1000 | 1 | 50 | 0.72 | 7.51 |
| 1000 | 1 | 100 | 0.90 | 7.53 |
| 1000 | 1 | 200 | 0.64 | 7.53 |

As apparent from the data in Table 6, the densification of the pellets of the Example 16 composition was completed at temperatures as low as 900° C. This compares with a sintering temperature of 1285° C. for PZT powder of the same composition produced by the conventional method of milling and calcination of oxides. A second method for sintering was performed on the Example 16 composition in which no PbZrO$_3$ powder was used as a PbO source. The pellets were placed on Pt foil on an alumina plate covered with a 100 cc alumina dish, and sintered at temperatures of 850° and 900° C. for times of 1 to 4 hours, with a heating rate to 50° C. per hour. Weight loss and sintering data are presented in Table 7 below:

TABLE 7

| Temp (°C.) | Time (hr) | Weight loss (%) | Density (g/cm³) |
|---|---|---|---|
| 850 | 2 | 0.55 | 7.59 |
| 850 | 4 | 0.70 | 7.58 |
| 900 | 1 | 0.73 | 7.58 |
| 900 | 2 | 0.75 | 7.58 |

As apparent from the data in Table 7 it is possible to sinter pellets of the Example 16 composition without a PbO atmosphere at temperatures as low as 850° C. Conventionally prepared PZT powder requires careful control of the PbO atmosphere for densification to occur.

EXAMPLE 16

A barium titanate composition was produced with the formula $(Ba_{0.87}Ca_{0.13})(Zr_{0.12}Ti_{0.88})O_3$. An amount of 60.63 grams of zirconium oxychloride solution containing about 20 percent $ZRO_2$ by weight was mixed with 320 grams of a distilled water and about 250 grams of a titanium oxychloride solution containing about 22 percent $TiO_2$ by weight. In a 4-liter capacity blender, a basic solution was prepared by dissolving about 300 grams of a 50 percent by weight KOH solution in 1500 grams of distilled water.

While blending the caustic solution at a rate of approximately 3000 rpm, the about 450 grams of the mixed solution containing Ti, and Zr chlorides was slowly poured into it. The hydroxide slurry which was formed was allowed to blend for an additional 15 minutes. The slurry was then centrifuged at 2000 rpm for 15 minutes and 1500 ml of clear filtrate was collected having a pH of 11.73. The precipitate was redispersed in the blender with 1000 ml distilled water and was blended for 20 minutes. It was then recovered by filtration and washed two additional times in the same manner.

The precipitate was again redispersed in 1000 ml water, and about 164 grams $Ba(OH)_2.8H_2O$ and 4.31 grams of CaO were blended in. The slurry was diluted to a total volume of 1.5 liters and the pH was measured to be 12.05.

The slurry was poured into a 3.785-liter capacity stainless steel autoclave, heated to 300° C. over 150 minutes at a stirring rate of 350 rpm and held at temperature for 30 minutes. It was then cooled to 90° C. and removed from the autoclave.

The slurry was immediately filtered, and 1250 ml of clear filtrate were collected. The filtrate was analyzed by ICP and was determined to contain about 0.38 ppm Ca and about 6.75 ppm Ba. From these measurements, incorporation levels of Ca and Ba were calculated to be both 99.99 percent. All other elements were essentially 100 percent incorporated. The solids were washed in the same manner as the hydroxide gel were then dried in a vacuum oven at 60° C. for several hours. The solids were white in color and were analyzed by XRD for crystalline phase. The XRD pattern is shown in FIG. 8. The product contained perovskite structure material with a minor concentration of barium carbonate which was present in the starting barium hydroxide feed material. A TEM micrograph of the material is shown in FIG. 9A. The particles appear spherical and uniform, with an approximate average diameter of 0.3 microns.

The powder was compacted into a small disc using an isostatic press which was then cold isostatically pressed to a green density of about 55 percent. The specimen was sintered over the temperature range of 1150° to 1300° C. The material sintered to near full density at a temperature of 1300° C. Reduction in sintering temperature is expected by using a purer source of barium hydroxide with a lower carbonate content.

EXAMPLES 17–18

Two experiments were carried out to produce the formulation $(Ba_{0.82}Ca_{0.13}Sr_{0.05})(Ti_{0.83}Zr_{0.12}Sn_{0.05})O_3$. The conditions employed in each experiment are summarized in Table 8. The procedure given in Example 17 was used for production of the hydroxide gel. Tin was added as tin chloride in step (1) and strontium was added as $Sr(OH)_2.8H_2O$ in step (4). Hydroxide gel preparation pH was varied for these experiments.

TABLE 8

HYDROTHERMAL SYNTHESIS OF DIELECTRIC FORMULATIONS CONTAINING CALCIUM, STRONTIUM, ZIRCONIUM AND TIN

| Ex. | Hydroxide Gel pH | Reaction Temp. °C. | Reaction Time min. | Concentrations of Unreacted Elements, ppm | | | | | Avg Particle Size, μm |
|---|---|---|---|---|---|---|---|---|---|
| | | | | Zr | Ti | Sn | Sr | Ba | Ca | |
| 17 | 8.87 | 300 | 30 | <1 | <1 | 40.4 | <1 | 41.6 | <1 | 0.30 |
| 18 | 7.90 | 300 | 30 | <1 | <1 | 14.4 | <1 | 70.1 | <1 | 0.47 |

Perovskite compounds were formed from both gels of Table 8. XRD patterns are shown for these powders in FIG. 10. As in the previous example, some barium carbonate was found in the crystalline products which was present in the starting material. Sintering at 1200° C. drove off all of the carbonate fraction. An XRD pattern of the face of a ceramic specimen from Example 17 is shown in FIG. 11. The ceramic was a single phase perovskite with fine grain size.

Incorporation of barium decreased slightly at the reduced hydroxide pH levels. Levels of incorporation ranged from 99.93 percent to 99.89 percent. Tin was very slightly soluble under the conditions of the experiments. Levels of tin incorporation ranged from 98.84 to 99.59 percent, depending on hydroxide gel preparation pH. Lower pH level favored higher tin incorporation. Solubility data for tin, barium, strontium, calcium, zirconium and titanium are included in the plots shown in FIGS. 1A and 1B.

The powder produced in Example 17 was found to consist of uniform and unagglomerated particles. FIG. 9B shows a TEM picture of this powder. TEM image analysis showed that the powder had a mean particle size of 0.26 microns. Eighty percent of the particles had diameters of 0.2 to 0.3 microns. It is expected that similar essentially barium titanate particles produced by this invention will have particle sizes less than about 1.0 micron.

EXAMPLE 18

A PZT composition was produced with the formula $Pb(ZR_{0.943}Ti_{0.057})O_3$ using the same general procedure as in the previous examples. Zirconium and titanium chlorides were used in step (1). Ammonium hydroxide was used as a precipitant in step (2). A reaction temperature of 350° C. was used in step (5). A fine perovskite lead zirconate titanate product was formed.

EXAMPLE 19

A PZT compound was produced with the formula Pb(Zr$_{0.90}$Ti$_{0.10}$)O$_3$ using the same general procedure as in the previous examples. Zirconium and titanium chlorides were used in step (1). Ammonium hydroxide was used as a precipitant in step (2). A reaction temperature of 300° C. for 2 hours was used in step (5). In addition, the process pH was adjusted to 12.99 in step (5) to select or favor desired particle sizes by adding potassium hydroxide. A fine lead zirconate titanate product was formed.

EXAMPLE 20

A PZT composition was produced with the formula Pb(Zr$_{0.52}$Ti$_{0.48}$)O$_3$. titanium chloride and zirconium oxychloride were used in step (1). Ammonium hydroxide was used as a precipitant in step (2). A reaction temperature of 300° C. for 2 hours used in step (5). A fine perovskite lead zirconate titanate product was formed with an average particle size of about 0.1 microns.

While the forms of the invention herein disclosed constitute presently preferred embodiments. many others are possible. It is not intended herein to mention all of the possible equivalent forms or ramifications of the invention. It is to be understood that the terms used herein are merely descriptive rather than limiting. and that various changes may be made without departing from the spirit or scope of the invention.

We claim:

1. A process for making a crystalline ceramic powder having a perovskite structure, ABO$_3$, comprising:
    a. preparing a first acidic solution containing one or more elements selected from the group consisting of hafnium. zirconium. titanium. niobium. tantalum. uranium, iron. antimony. lanthanum. bismuth. thorium. indium. nickel. manganese, neodymium, samarium, cobalt. tungsten. tin, vanadium. dysprosium. praseodymium. yttrium. promethium. europium. cerium. ytterbium. lutetium. scandium. gadolinium. terbium. holmium. erbium. thulium, chromium. potassium, and lithium;
    b. preparing a second basic solution containing a sufficient concentration of hydroxide to provide a pH when mixed with the first solution to achieve nearly complete incorporation of elements added in step (d) during the hydrothermal treatment step (e) and adding the first acidic solution to the second basic solution to precipitate a substantially pure mixture of hydroxides;
    c. washing the precipitate to remove hydroxide and salt impurities that solubilize lead or other constituent elements of the powder;
    d. preparing an aqueous slurry of the washed precipitate and adding oxides or hydroxides of one or more of the elements selected from the group consisting of barium, strontium, calcium, magnesium, lead, zinc, yttrium, magnesium, manganese, cobalt, zinc and nickel, in an amount to achieve the desired stoichiometry;
    e. hydrothermally treating the slurry at an elevated temperature and pressure for a time sufficient to from the powder; and
    f. drying the powder; wherein when lead, zirconium and titanium are selected the perovskite has the general formula:

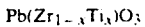

wherein when x has a value of:
    (1) between 0 and 0.44. the total dopant and solid substitution level ranges from 0 to 50 mole percent;
    (2) between 0.44 and 0.55, then the total dopant and solid solution substitution has a level between 13 to 50 mole percent;
    (3) between 0.55 to 1.00 the total dopant and solid substitution level ranges from 0 to 50 mole percent.

2. The process according to claim 1, wherein the hydroxide of step (b) is selected from the group consisting of sodium hydroxide, ammonium hydroxide, and potassium hydroxide, with the proviso that when manganese, nickel, or cobalt are selected in step (a) ammonium hydroxide is not selected.

3. The process according to claim 1 comprising controlling the pH of step (b) to select the average particle size of the powder.

4. The process of claim 1 wherein the pH of step (c) is controlled to favor nearly complete incorporation of elements.

5. The process according to claim 1 wherein the first acidic solution is added to the second basic solution to form a precipitate at a pH ranging from about 4 to about 12.

6. The process according to claim 1 wherein the compounds of step (d) are added to the aqueous slurry of the washed precipitate at a pH ranging from about 10 to about 13.

7. The process according to claim 1 wherein the precipitate is washed with distilled water.

8. The process according to claim 1 wherein the powder is lead zirconate titanate and has a primary crystallite size of less than about 0.4 microns and a secondary particle size of less than about 2 microns.

9. The process according to claim 1 wherein the powder is lead zirconate titanate and has a primary crystallite size ranging from about 0.20 microns to about 0.60 microns, and a secondary particle size ranging from about 0.4 microns to about 2.0 microns.

10. The process according to claim 1, wherein the lead zirconate titanate element selected in step (a) is La and comprises between 13 to about 50 mole percent of the powder product.

11. A process for making a crystalline ceramic powder having a perovskite structure, ABO$_3$, comprising:
    a. dissolving one or more acidic salts of elements selected from the group consisting of hafnium, zirconium, titanium, niobium, tantalum, uranium, iron, antimony, lanthanum, bismuth, thorium, indium, nickel, manganese, neodymium, samarium, cobalt, tungsten, tin, vanadium, dysprosium, praseodymium, yttrium, promethium, europium, cerium, ytterbium, lutetium, scandium, gadolinium, terbium, holmium, erbium, chromium, potassium, and lithium in an aqueous solution to form an acidic solution, wherein the composition of the solution is equal to the desired perovskite stoichiometry;
    b. slowly adding the solution of step (a) to a vigorously mixed basic solution containing hydroxides of sodium, ammonium, and potassium wherein ammonium is not used when manganese, nickel, or cobalt are selected as an ingredient in step (a), until a pH value between 4 and 12 is reached in a range where all elements are essentially precipitated as hydroxides; and where an equal or narrower pH range in selected which will provide nearly complete incorporation in step (e), of elements added in step (d);

c. separating the precipitate from the solution and washing with purified water;

d. redispersing the washed precipitate in water and mixing with the oxides or hydroxides of one or more of the elements selected from the group consisting of barium, strontium, calcium, magnesium, lead, zinc, yttrium, magnesium, manganese, cobalt, zinc and nickel in the proper ratio to obtain a mixture with a stoichiometry equal to the desired stoichiometry, whereby a homogeneous slurry is produced;

e. hydrothermally treating the slurry at a temperature, at a pressure, and for time sufficient for form a perovskite slurry; and f. cooling the perovskite slurry, separating the perovskite, washing with purified water and drying; wherein when lead, zirconium and titanium are selected the perovskite has the general formula:

$$Pb(Zr_{1-x}Ti_x)O_3$$

wherein when x has a value of:
(1) between 0 and 0.44, the total dopant and solid substitution level ranges from 0 to 50 mole percent;
(2) between 0.44 and 0.55 then the total dopant and solid solution substitution level is between 13 and 50 mole percent;
(3) between 0.55 and 1.00, the total dopant and solid substitution level is between 0 to 50 mole percent.

12. The process according to claim 11 comprising controlling the pH of step (b) to favor the formation of particles of desired size.

13. The process according to claim 11 wherein the precipitate is washed with distilled water.

14. The process according to claim 11 wherein the powder is lead zirconate titanate and has a primary crystalline size of less than about 0.4 microns and a secondary crystalline size of about 2 microns.

15. The process according to claim 1 comprising controlling the pH of step (b) and step (d) to select the average particle size of the powder.

16. The process according to claim 11 comprising controlling the pH of step (b) and step (d) to favor the formation of particles of desired size.

* * * * *

UNITED STATES PATENT AND TRADEMARK OFFICE
CERTIFICATE OF CORRECTION

PATENT NO. : 5,112,433

DATED : May 12, 1992

INVENTOR(S) : William J. Dawson, et al.

It is certified that error appears in the above-identified patent and that said Letters Patent is hereby corrected as shown below:

On the title page, change the filing date from December 9, 1998 to read--December 8, 1988--.

Signed and Sealed this

Fifteenth Day of June, 1993

Attest:

MICHAEL K. KIRK

Attesting Officer

Acting Commissioner of Patents and Trademarks

UNITED STATES PATENT AND TRADEMARK OFFICE
CERTIFICATE OF CORRECTION

PATENT NO. : 5,112,433

DATED : May 12, 1992

INVENTOR(S) : William J. Dawson and Scott L. Swartz

Page 1 of 2

It is certified that error appears in the above-indentified patent and that said Letters Patent is hereby corrected as shown below:

Column 1, line 30, "perovskite" should be -- Perovskite --.

Column 1, line 39, "in article" should be -- in an article --.

Column 2, line 49, "Ng," should be -- Nb, --.

Column 7, line 27, "(mater." should be -- (Mater. --.

Column 7, line 28, "(mat." should be -- (Mat. --.

Column 10, line 52, "ph" should be -- pH --.

Column 10, line 54, "for" should be -- For --.

Column 11, line 8, "for" should be -- For --.

Column 13, line 10, "step" should be -- Step --.

Column 14, line 23, change "300°C." to --300 C--.

Column 15, line 35, a "^" mark indicating optimum pH should be positioned between a pH of 6.5 and 7.

Column 16, line 5, "is" should be -- in --.

Column 17, line 40, "process" should be -- Process --.

UNITED STATES PATENT AND TRADEMARK OFFICE
CERTIFICATE OF CORRECTION

PATENT NO. : 5,112,433
DATED : May 12, 1992
INVENTOR(S) : William J. Dawson and Scott L. Swartz It is certified that error appears in the above-indentified patent and that said Letters Patent is hereby corrected as shown below:

Column 19, line 66, "particle" should -- Particle --.

Column 21, line 19, "ZRO$_2$" should be -- ZrO$_2$ --.

Column 23, line 19, "titanium" should be -- Titanium --.

Column 24, line 57, "lungsten," should be -- tungsten --.

Signed and Sealed this

Fourth Day of October, 1994

Attest:

BRUCE LEHMAN

*Attesting Officer*    *Commissioner of Patents and Trademarks*